(12) United States Patent
Jeffery et al.

(10) Patent No.: US 11,794,094 B2
(45) Date of Patent: Oct. 24, 2023

(54) METHOD AND SYSTEM FOR USING SENSORS OF A CONTROL DEVICE FOR CONTROL OF A GAME

(71) Applicant: Aquimo, Inc., Mesa, AZ (US)

(72) Inventors: Mark John Jeffery, Mesa, AZ (US); Robert Sunshin Komorous-King, Berkeley, CA (US); Manoj Kumar Rana, Gurgaon (IN); James S. Frey, Glenview, IL (US); Jordan Matthew Blackman, Los Angeles, CA (US)

(73) Assignee: AQUIMO INC., Mesa, AZ (US)

( * ) Notice: Subject to any disclaimer, the term of this patent is extended or adjusted under 35 U.S.C. 154(b) by 0 days.

(21) Appl. No.: 15/296,017

(22) Filed: Oct. 17, 2016

(65) Prior Publication Data

US 2018/0104573 A1   Apr. 19, 2018

(51) Int. Cl.
| | |
|---|---|
| *A63F 13/211* | (2014.01) |
| *G06F 1/16* | (2006.01) |
| *G06F 3/0346* | (2013.01) |
| *A63F 13/428* | (2014.01) |
| *G06F 3/04883* | (2022.01) |
| *A63F 13/26* | (2014.01) |

(Continued)

(52) U.S. Cl.
CPC ............ *A63F 13/211* (2014.09); *A63F 13/26* (2014.09); *A63F 13/27* (2014.09); *A63F 13/35* (2014.09); *A63F 13/40* (2014.09); *A63F 13/428* (2014.09); *A63F 13/812* (2014.09); *A63F 13/92* (2014.09); *G06F 1/1694* (2013.01); *G06F 3/017* (2013.01); *G06F 3/0346* (2013.01); *G06F 3/041* (2013.01); *G06F 3/04883* (2013.01); *G06T 13/40* (2013.01); *A63F 13/2145* (2014.09); *A63F 2300/105* (2013.01); *A63F 2300/8029* (2013.01); *A63F 2300/8082* (2013.01); *G06F 2200/1637* (2013.01); *G06F 2203/0381* (2013.01)

(58) Field of Classification Search
CPC .. A63F 13/211; A63F 13/2145; A63F 13/812; A63F 9/24; A63F 13/355; A63F 13/27; A63F 13/35; A63F 13/40; A63F 13/92; A63F 2300/105; A63F 2300/8029; A63F 2300/8082; G06F 3/041; G06F 3/017; G06T 13/40
USPC ......................................................... 463/31
See application file for complete search history.

(56) References Cited

U.S. PATENT DOCUMENTS

| | | |
|---|---|---|
| 6,394,906 B1 | 5/2002 | Ogata |
| 8,171,145 B2 | 5/2012 | Allen et al. |
| | (Continued) | |

FOREIGN PATENT DOCUMENTS

WO    2011053839    5/2011

*Primary Examiner* — Jay Trent Liddle
*Assistant Examiner* — Ryan Hsu

(57) ABSTRACT

A control device with a touch screen and motion sensors is held in one hand with the screen facing the user. Preferably, thumb motion of the hand holding the control device on the touch screen sensor of the control device is the input to control the motion and animations of an avatar, wherein the avatar motion is displayed on the control device touch screen or, in an embodiment, on an external display device. An important aspect of the present invention is tilting the control device, causing an angular rotation velocity, which can trigger a game event such as throwing, kicking, shooting or other action of the game.

11 Claims, 23 Drawing Sheets

(51) Int. Cl.
*A63F 13/27* (2014.01)
*A63F 13/35* (2014.01)
*A63F 13/40* (2014.01)
*A63F 13/812* (2014.01)
*A63F 13/92* (2014.01)
*G06F 3/01* (2006.01)
*G06F 3/041* (2006.01)
*G06T 13/40* (2011.01)
*A63F 13/2145* (2014.01)

(56) References Cited

U.S. PATENT DOCUMENTS

| | | | |
|---|---|---|---|
| 8,594,862 B2 | 11/2013 | Callou et al. | |
| 8,892,390 B2 * | 11/2014 | MacGougan | G06F 3/0346 702/141 |
| 9,063,704 B2 | 6/2015 | Vonog et al. | |
| 9,101,812 B2 | 8/2015 | Jeffery et al. | |
| 9,262,073 B2 | 2/2016 | Howard | |
| 9,317,110 B2 | 4/2016 | Lutnick et al. | |
| 2011/0092289 A1 * | 4/2011 | Dagman | A63F 13/211 463/37 |
| 2012/0165100 A1 * | 6/2012 | Lalancette | A63F 13/10 463/42 |
| 2012/0176413 A1 * | 7/2012 | Kulik | G06F 1/1626 345/659 |
| 2013/0150121 A1 * | 6/2013 | Jeffery | H04W 4/00 455/556.1 |
| 2013/0249786 A1 | 9/2013 | Wang | |
| 2013/0296048 A1 * | 11/2013 | Jeffery | A63F 13/12 463/31 |
| 2014/0040809 A1 * | 2/2014 | Lee | G06F 3/0346 715/773 |
| 2014/0152563 A1 * | 6/2014 | Ouchi | G06F 3/0487 345/158 |
| 2016/0059120 A1 | 3/2016 | Komorous-King et al. | |
| 2016/0179218 A1 * | 6/2016 | Rosenzweig | G06F 3/0383 345/156 |

* cited by examiner

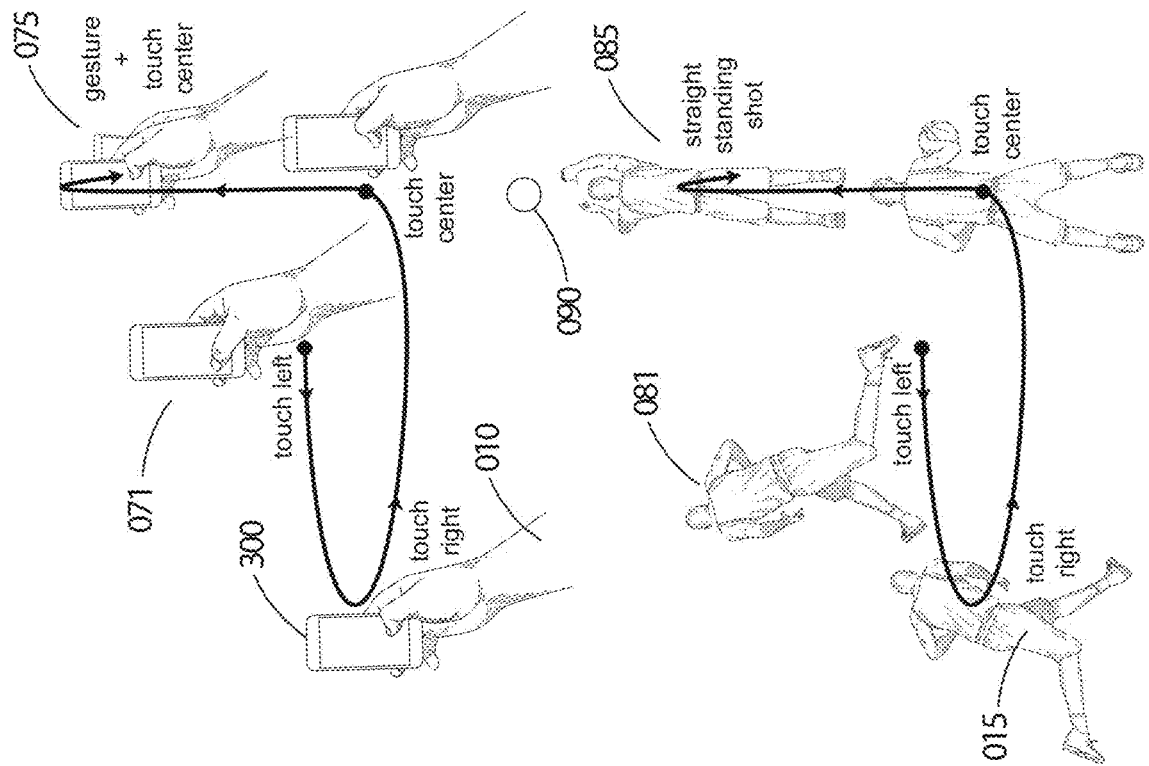
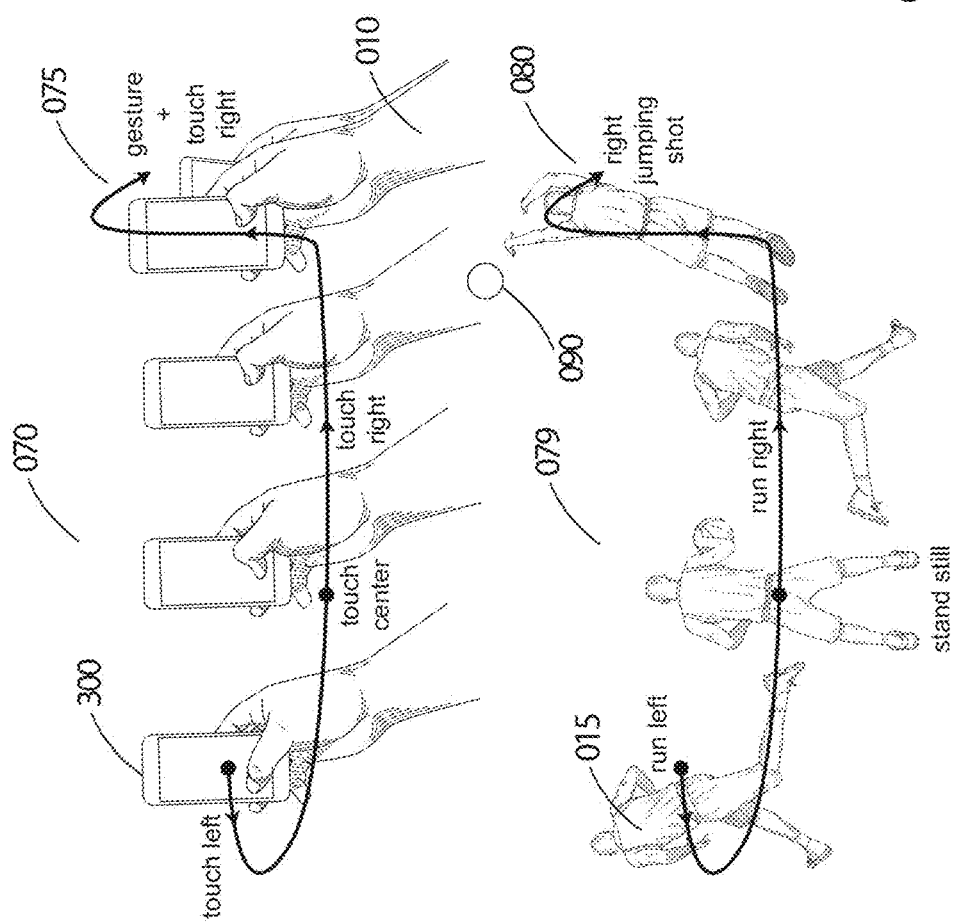
Fig. 7 (a)
Fig. 7 (b)

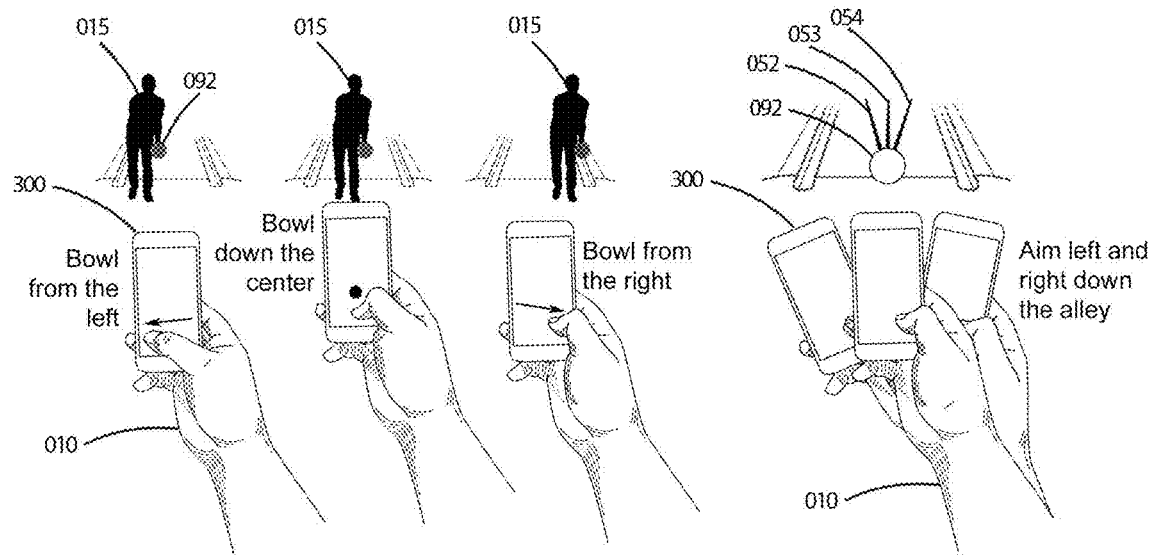
Fig. 14 (a)
Fig. 14 (b)
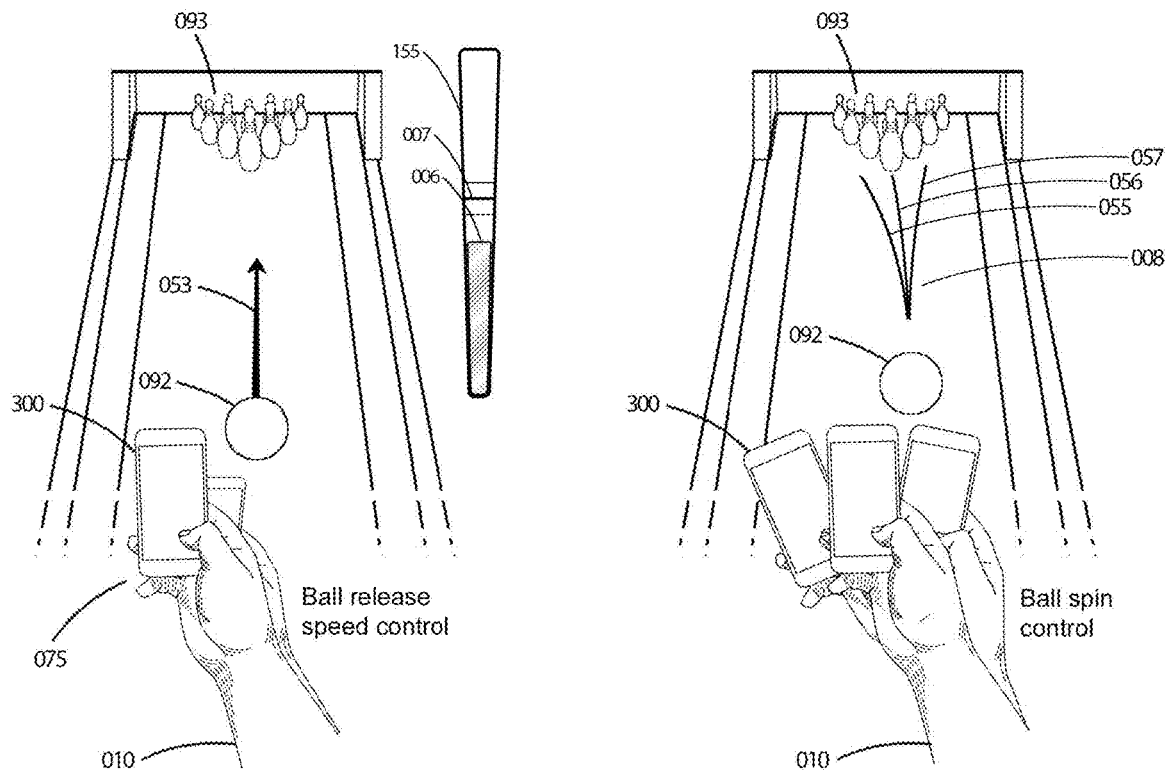
Fig. 14 (c)
Fig. 14 (d)

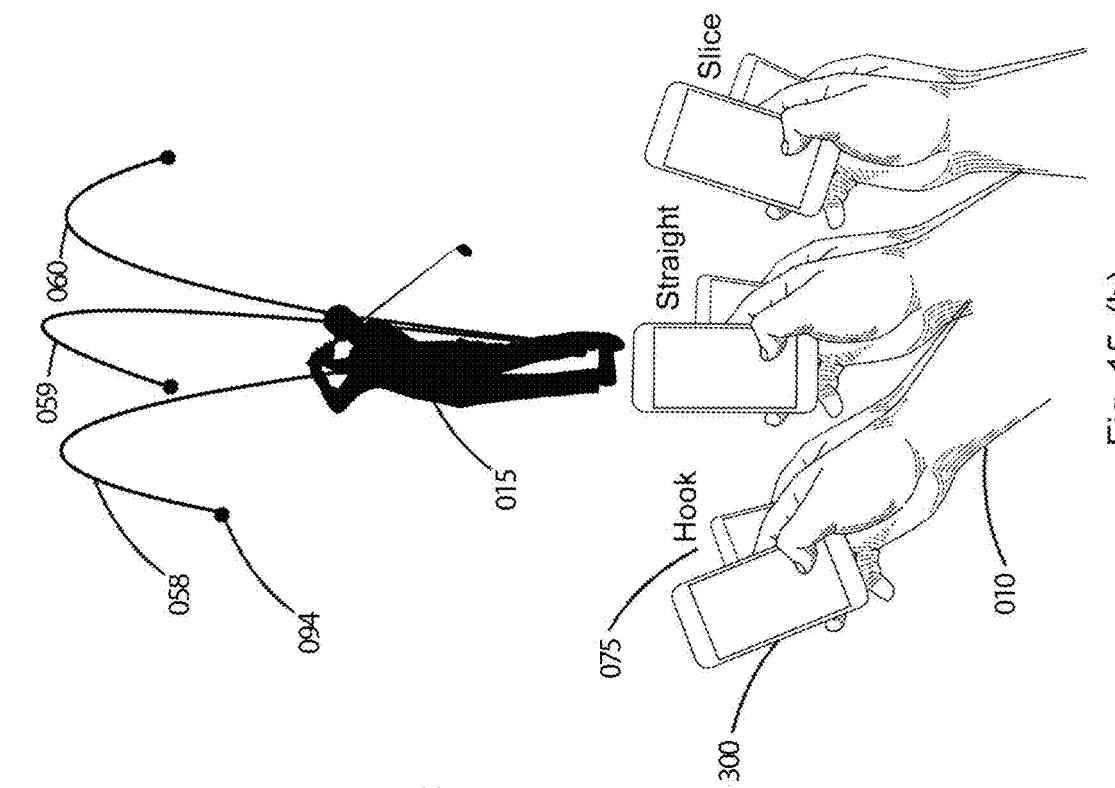
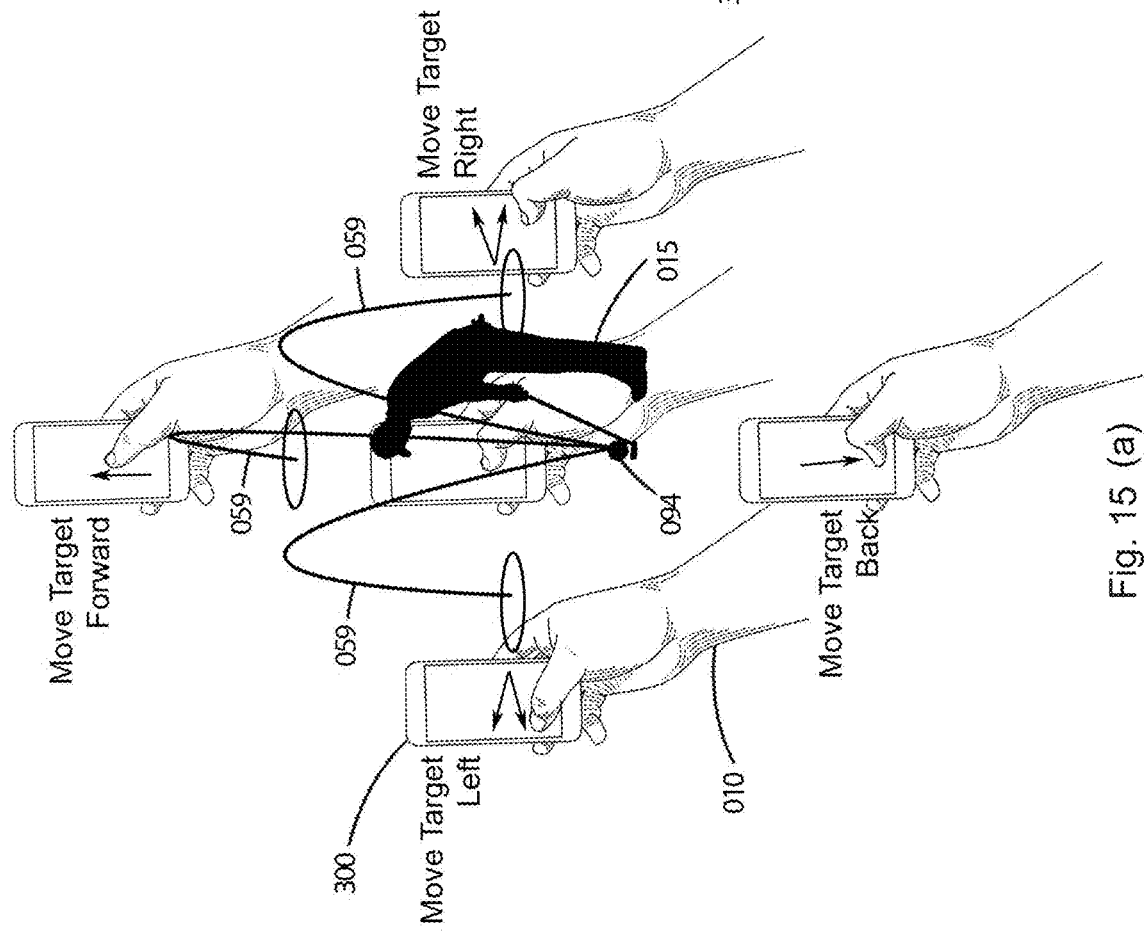

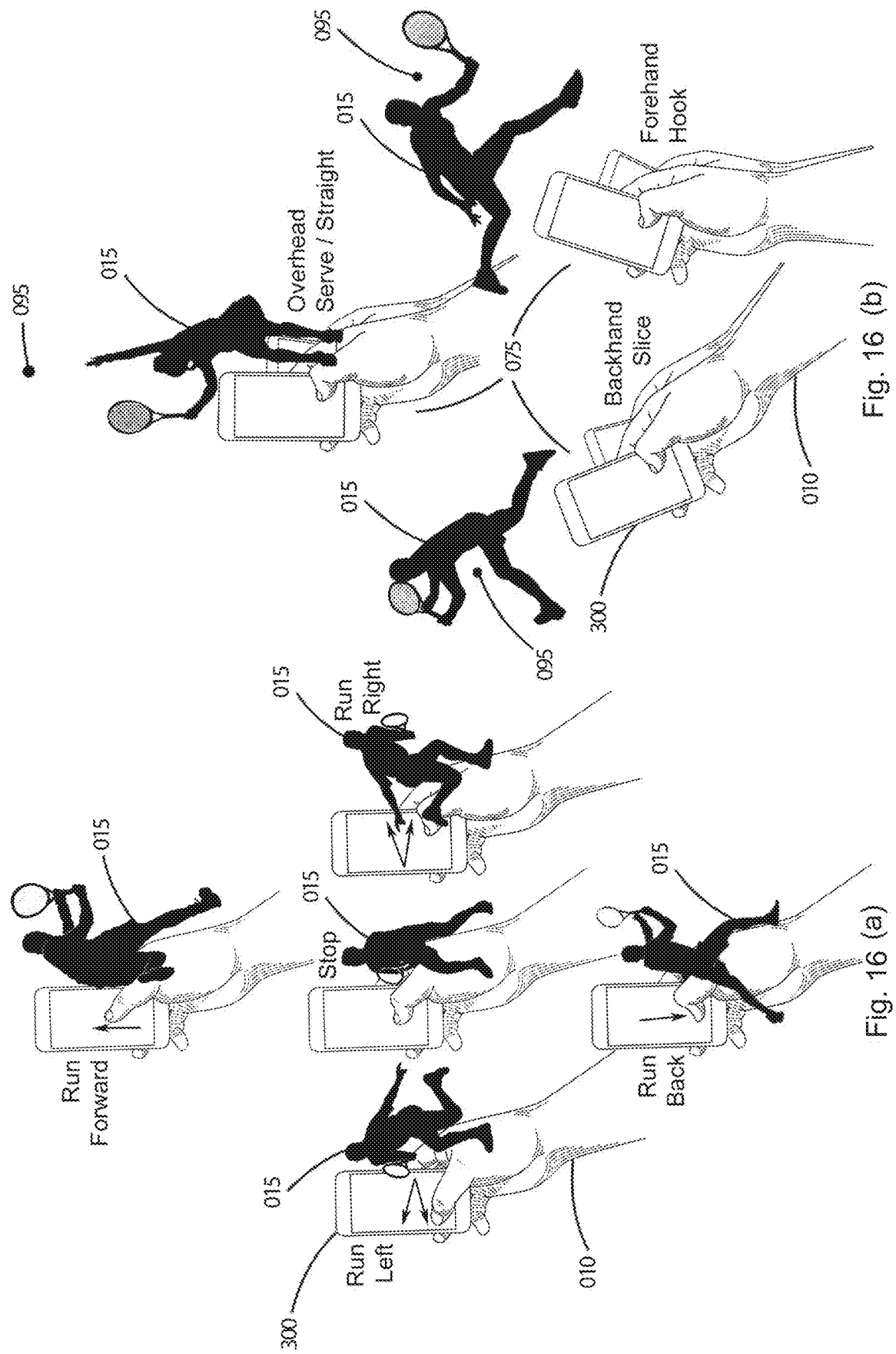

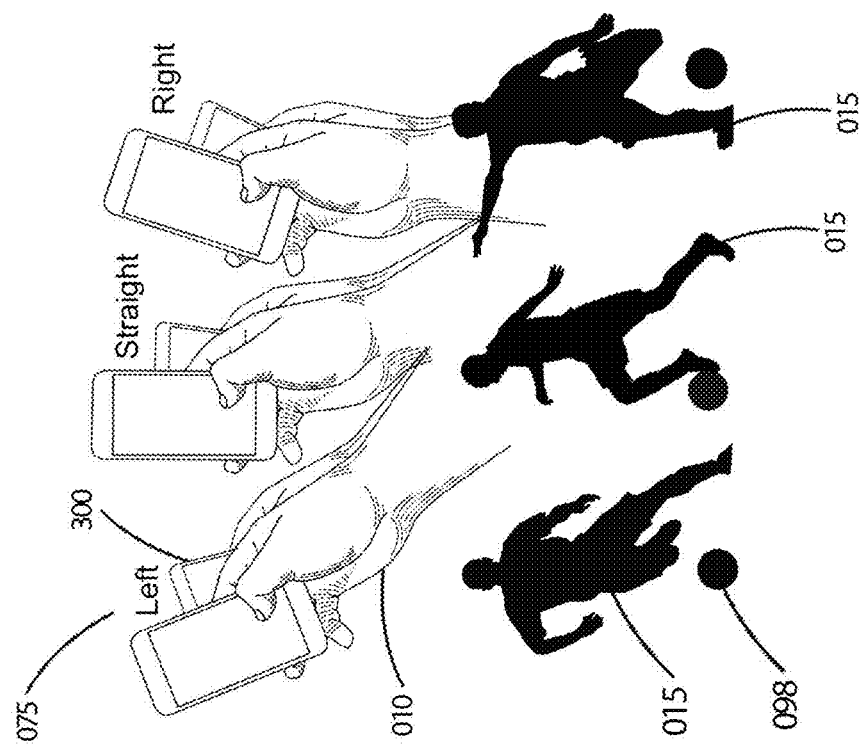
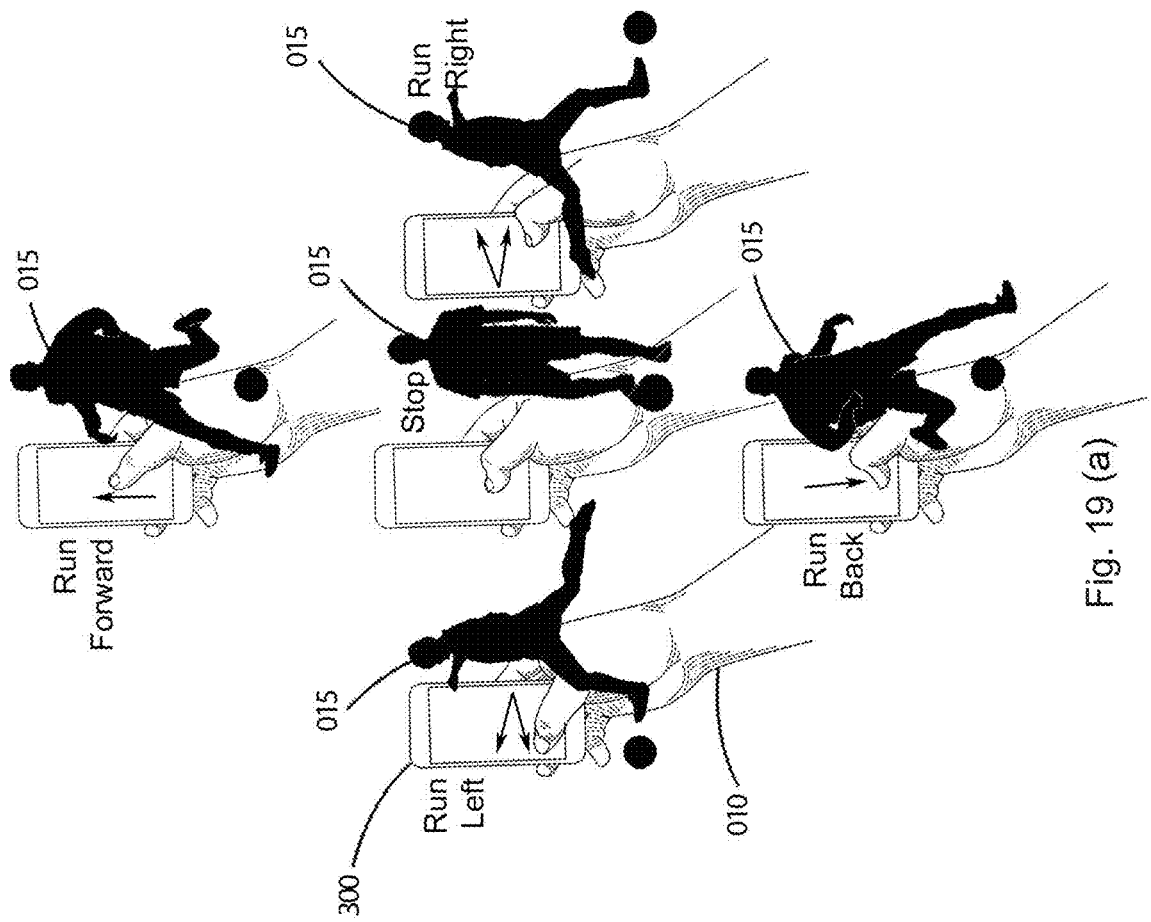
Fig. 19 (a)
Fig. 19 (b)

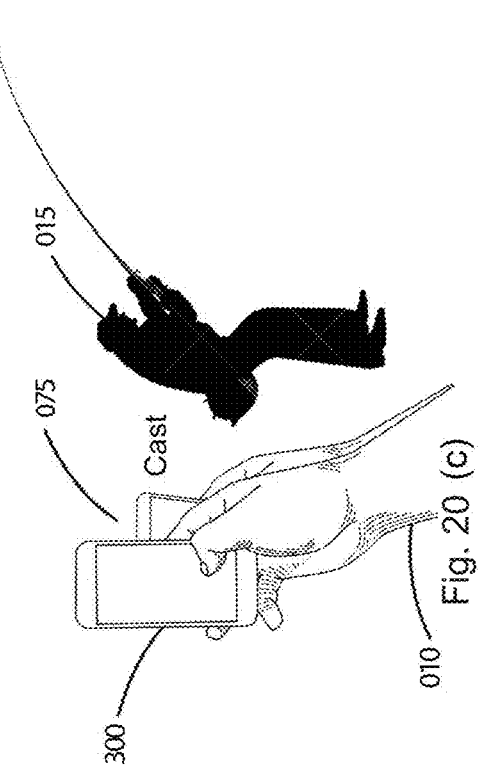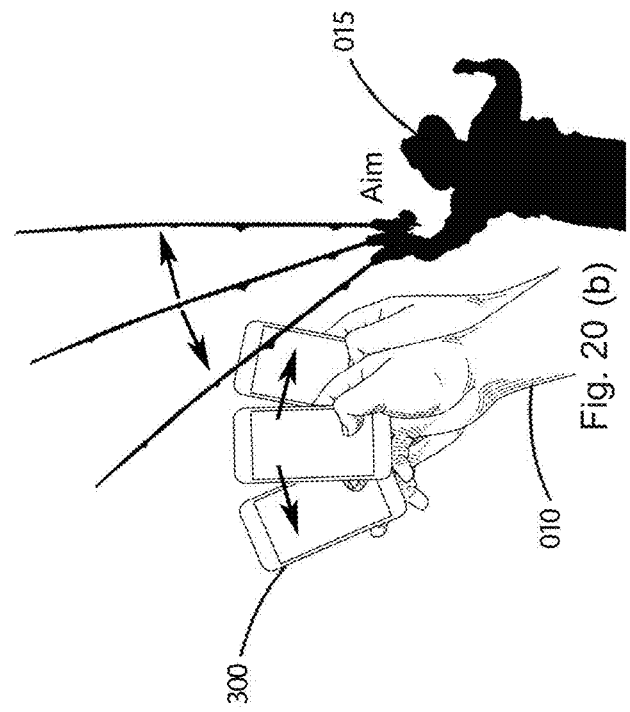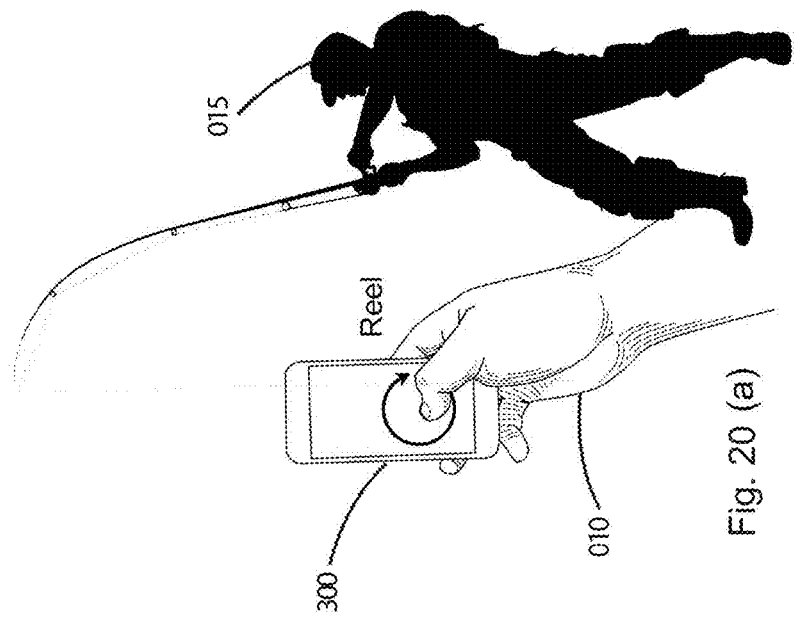

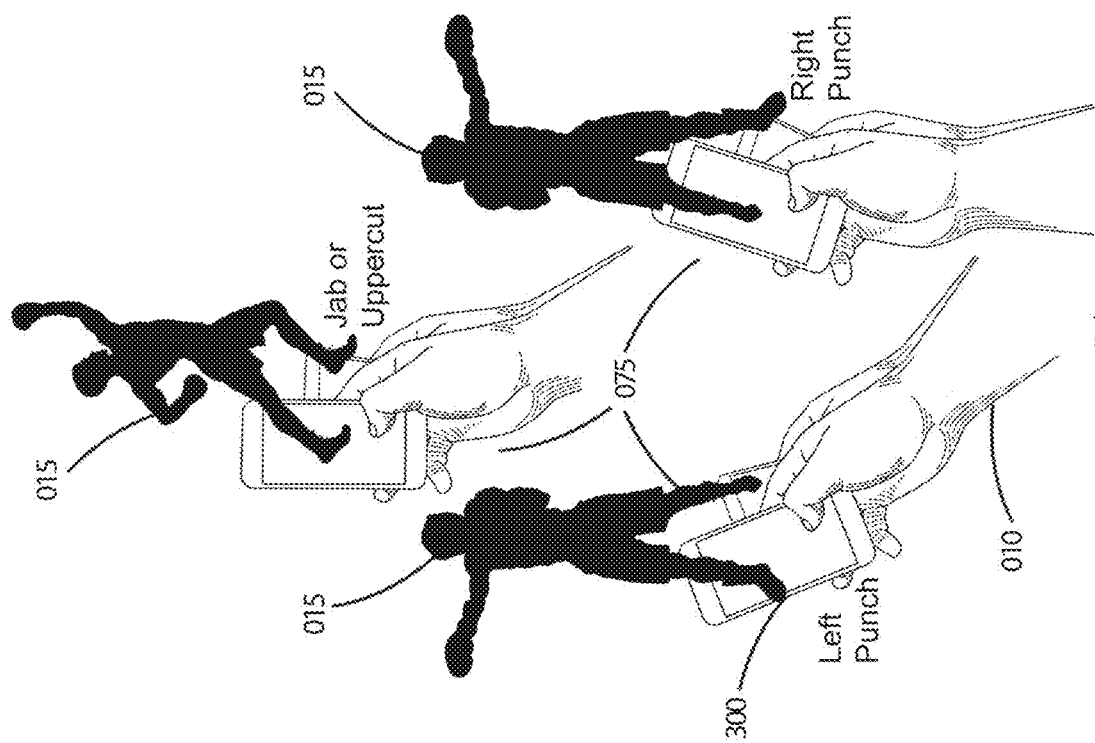
Fig. 21 (b)
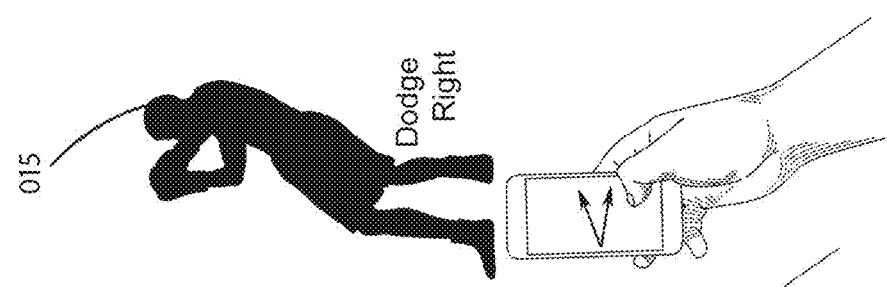
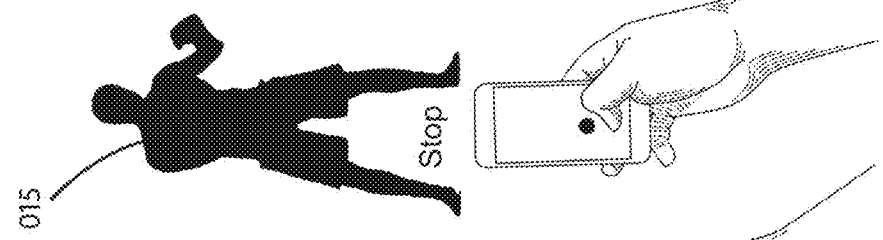
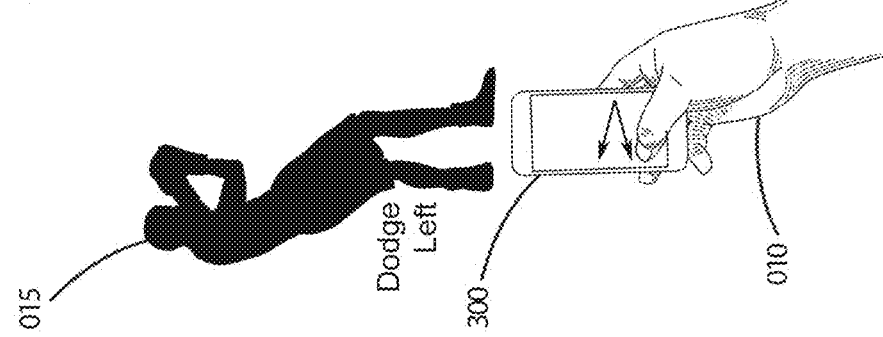
Fig. 21 (a)

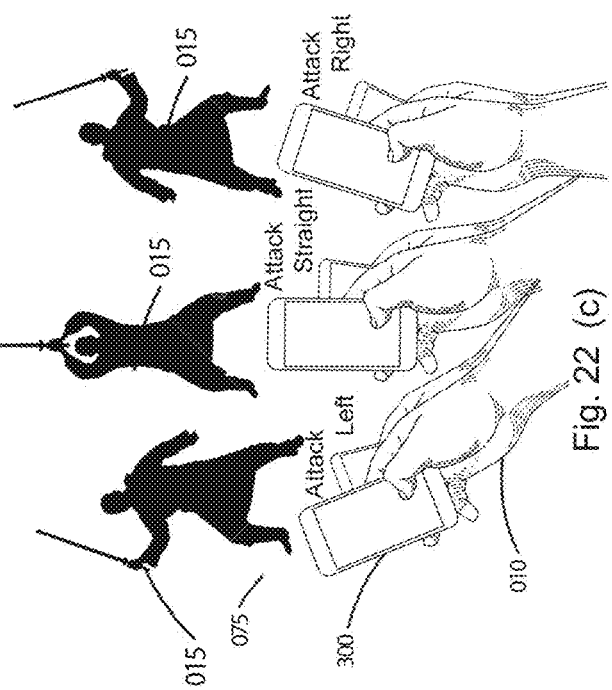
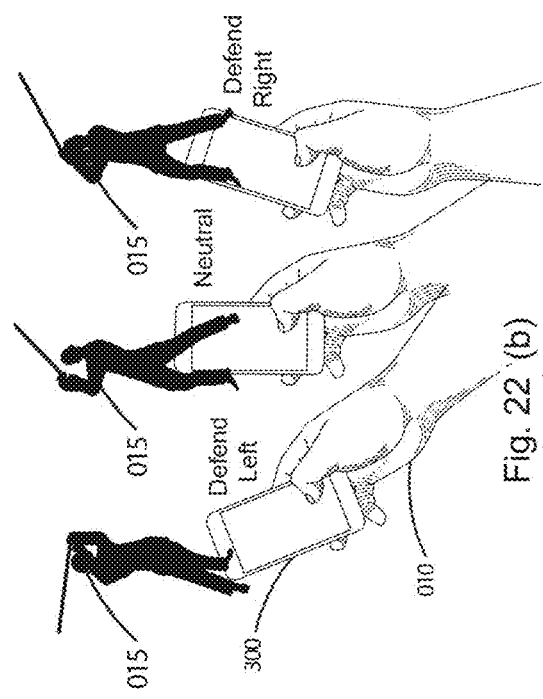
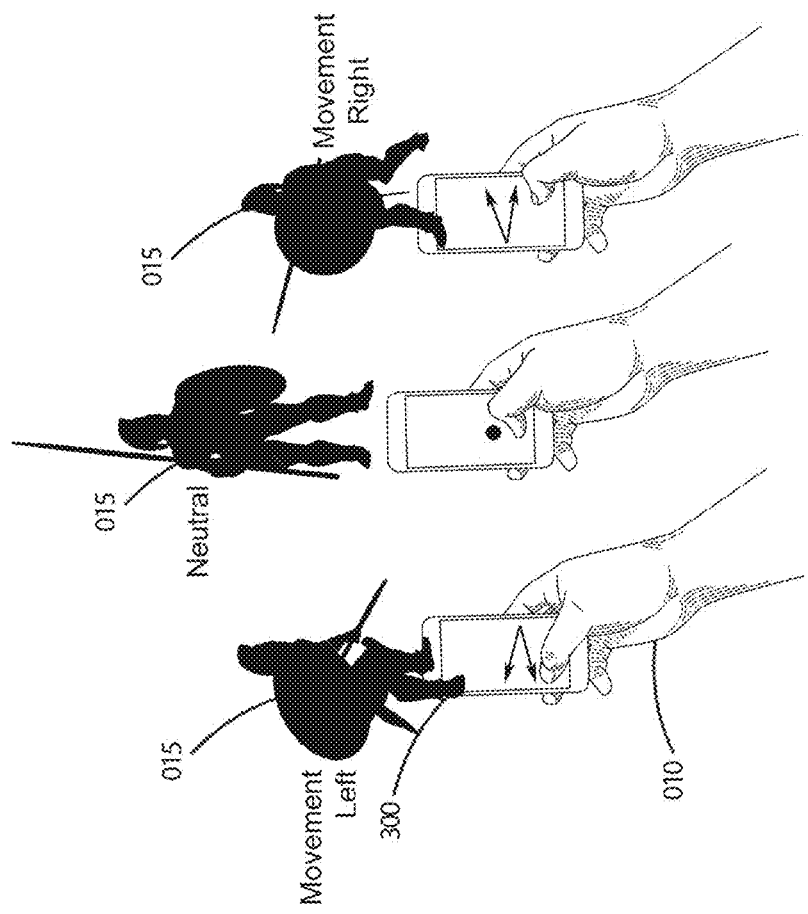
Fig. 22 (a)
Fig. 22 (b)
Fig. 22 (c)

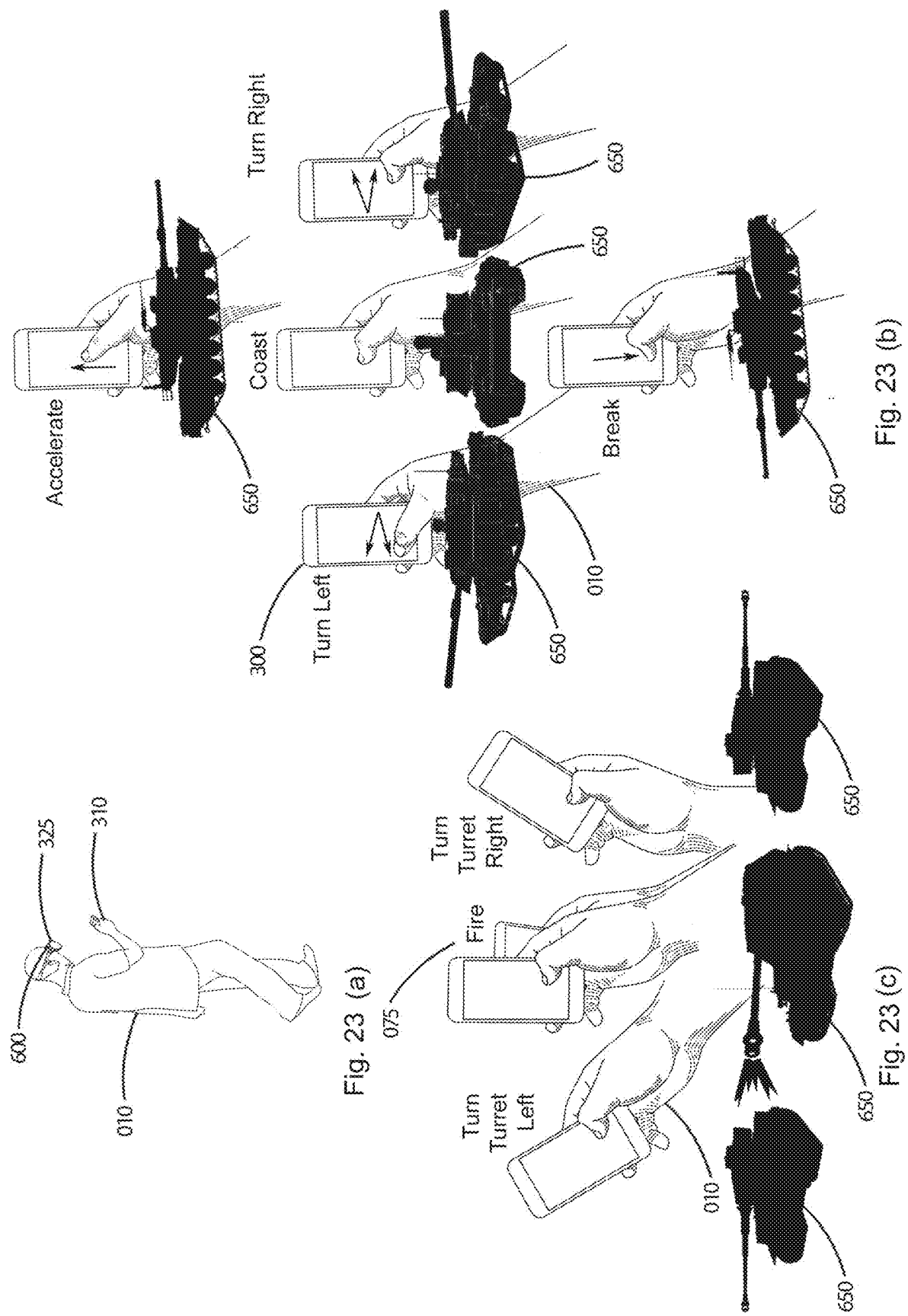

METHOD AND SYSTEM FOR USING SENSORS OF A CONTROL DEVICE FOR CONTROL OF A GAME

BACKGROUND OF THE INVENTION

1. Field of the Invention

The present invention relates to a method and system for using sensors of a control device for control of a game.

2. Description of the Related Art

There is considerable prior art relating to the control of video game systems. A common way to control a video game is to use an interactive game controller. An interactive game controller typically includes multiple buttons, directional pads, analog sticks, etc., to control the play of a video game. This prior art method requires the user to hold the game controller with two hands, with both thumbs and fingers touching the left and right buttons and actuators/analog sticks respectively. An example of such an interactive game controller is disclosed in U.S. Pat. No. 6,394,906 to Ogata entitled "Actuating Device for Game Machine," assigned to SONY Computer Entertainment, Inc.

U.S. Pat. No. 9,262,073 entitled "Touch Screen with Virtual Joystick and Methods for Use Therewith" to Howard extends the game control mechanism to a software joystick on the screen of a smartphone. Electronic Arts (Madden Mobile NFL 17) and 2K (NBA 2K 16) use this type of software control mechanisms in their mobile product by placing software buttons on the left and right side of the screen, wherein the game is played on the smartphone in a landscape format. Again, both hands are required to play the game with left and right thumbs controlling the gameplay via the virtual joysticks and control buttons.

Another approach is sensor-driven gaming. Nintendo Co., Ltd. has pioneered the use of sensors in gaming, and certain of their systems utilize a multi-button controller having a three-axis accelerometer. The Nintendo Wii system is augmented with an infrared bar. Other sensor-driven systems such as the SONY PlayStation Move and the Microsoft Xbox Kinect use an optical camera to detect motion in time and space.

Yet another approach to system control includes gesture-based systems. As an example, U.S. Published Patent Application 2013/0249786 to Wang entitled "Gesture-Based Control System" discloses a method of control where cameras observe and record images of a user's hand. Each observed movement or gesture is interpreted as a command. Gesture-based systems are also employed to facilitate human-computer interfaces. For example, U.S. Pat. No. 9,063,704 to Vonog et al. entitled "Identifying Gestures Using Multiple Sensors" focuses primarily on using adaptive sensors or mobile sensors for the use of recognizing continuous human gestures not related to gaming or system control. As another example, WIPO Publication No. WO/2011053839 to Bonnet entitled "Systems and Methods for Comprehensive Human Movement Analysis" discloses use of dual 3D camera capture for movement analysis, which are incorporated with audio and human movement for neurological studies and understanding.

Since the advent of the Apple iPhone in 2007, which incorporated motion sensors, many games have used these sensors to incorporate user input motion. U.S. Pat. No. 8,171,145 to Allen et al. entitled "System and Method for Two Way Communication and Controlling Content in a Game" disclose a method to connect to a web-enabled display on the same wireless network, and to control a video game played on the display using a smartphone. Their game control motions are similar to the Wii however, and are relatively simple motions.

Rolocule Games, of India, has introduced a smartphone-based tennis game, where the user plays an interactive tennis match swinging the phone to (1) serve, (2) hit backhand and (3) forehand shots. Rolocule also has a dancing game where the phone is held in the hand and motions are translated to those of a dancing avatar. Their method in both cases is to project the screen of the phone onto a display device via Apple TV or Google Chromecast. The game play in both cases is similar to prior art games for the Nintendo Wii.

U.S. Pat. No. 9,101,812 to Jeffery et al. entitled "Method and System to Analyze Sports Motions Using Motion Sensors of a Mobile Device" describes a technique to analyze a sports motion using the sensors of a control device. Jeffery et al. use the gyroscope to define a calibration point, and the virtual impact point or release point of a sports motion is calculated relative to this point.

Smartphones can also be used to control complex systems, such as an unmanned aerial vehicle (UAV). U.S. Pat. No. 8,594,862 to Callou et al., entitled "Method for the Intuitive Piloting of a Drone by Means of a Remote Control" discloses a method for control of a drone so that the user's control device motions and orientation are oriented with the drone flight direction and orientation. The motions of the control device are however limited.

Overall, the multi-button, multi-actuator interactive game controller is currently the best device to control a complex game, as the controller enables many dimensions of data input. There is a significant learning curve however, and the control commands are far from intuitive. For example, the controller does not simulate an actual sports motion, and complex button and actuator sequences are required to move an avatar through a virtual world and/or play sports games such as basketball or football. Furthermore, the controller is designed to work by connecting wirelessly to a gaming console, and must be held in both hands of the user.

The Wii remote provides a more realistic experience; however, the remote has several button controls and captures only gross motions of the user via the three axes accelerometer. Typical games played using this remote are simplified sports games. With the exception of bat or racquet motions, the user's avatar responds in a pre-programmed way depending upon the gross sports motion of the player.

Current smartphone based sports games are similar to the Wii—avatar positioning is selected from a small number of predetermined movements (typically a maximum of three) based upon the swing motion. Tennis is a primary example—the three possible motions are serve, forehand and backhand. These motions result in the avatar serving the ball or moving left or right on the court to hit the ball in response to the swing motion—however, the player cannot move the avatar towards the net, move backwards, run diagonally, or hit a lob shot, as examples. Furthermore, these methods often require the screen of the smartphone to not be in view of the user, which is not optimal for the design of a mobile game.

U.S. Pat. No. 9,317,110 to Lutnick et al. discloses a method for playing a card game, or other casino game, with hand gesture input. The preferred embodiment is based upon use of the accelerometer of the mobile device, which is noisy and does not enable the fine motion analysis required for control of a sports game.

One method of control of a mobile game is via a touch sensor wherein users swipe the screen. Temple Run 1 and 2 by Imanji Studio has the user swipe to turn, jump and slide, collect coins and advance. In Fruit Ninja, by Halfbrick Studios, users swipe to slash fruits, collect points and level up. As yet another example, in Bejeweled, by Electronic Arts, users swipe to collect gems and obtain points to purchase and unlock new stages. The swipe mechanism is often paired with buttons on the screen to add additional control functionality. Two hands are required for this control mechanism: one to hold the phone and the other to swipe. A few mobile games use the gyroscope for partial control of a game. In Highway Rider, by Battery Acid Games, users tilt the mobile device to steer a virtual motorcycle and in Raging Thunder 2, by Polar Bit, users tilt the device to steer a virtual car. Backbreaker Football, by Natural Motion, uses a tilt-forward motion to have a running back avatar run down a football field. However all of these games are designed in landscape format, to be held in both hands with additional thumb controls.

U.S. Published Patent Application 2016/0059120 to Komorous-King et al. entitled "Method of using Motion States of a Control Device for Control of a System" overcomes many of the limitations of the prior art. However, the method is not optimal for a mobile game used without an externally connected display device.

SUMMARY OF THE INVENTION

The present invention is for control of a game using a control device. The methods and system of the invention enable game control typically enabled by complex controllers, but in a preferred embodiment the invention does not require any buttons or actuators, or video capture of body movements or gestures. Various embodiments of the invention utilize sensors, such as the gyroscope, accelerometer, and a touch screen, of a control device such as a smart phone, smart watch, fitness band, or other device with motion sensors connected, via a cable or wirelessly, to a processor for analysis and translation.

In a preferred embodiment for a sports game, a control device with a touch screen and motion sensors is held in one hand with the screen facing the user. Preferably, thumb motion of the hand holding the control device on the touch screen sensor of the control device is the input to control the motion and animations of an avatar, wherein the avatar motion is displayed on the control device touch screen or, in an embodiment, on an external display device. An important aspect of the present invention is tilting the control device, causing an angular rotation velocity, which can trigger throwing, kicking, shooting or other action of the game.

As a non-limiting illustrative example of an embodiment for a basketball game, the angular rotation velocity detected by analyzing data from the gyroscope sensor (specifically, the change in pitch of the control device per unit time) enables fine motor control for shooting baskets, long or short and with a range in between. In combination with additional sensor data (such as the yaw gyroscope rotation of the control device) the shooting fidelity can include distance to the hoop and bank shots off the left or right side of the backboard. Furthermore, for the illustrative embodiment of a basketball game, the thumb motion on the touch screen enables continuous motion of the avatar on a virtual basketball court, wherein simultaneously tilting the control device with angular gestures enables high-fidelity shot making at any instant.

One aspect of the invention is a feedback meter on the display device, which in an embodiment provides real-time biofeedback to the user as to the strength of the gesture, preferably in multiple dimensions. The feedback meter enables biofeedback to the user, so that the control of a sports game via a gesture requires skill that can be learned with practice.

This fidelity of control of a game or system is not possible with previously disclosed prior art methods which rely upon the accelerometer sensor or swipes on the touch sensor. Furthermore, in a preferred embodiment the disclosed method of control is enabled by holding the control device in one hand in portrait mode, so that both hands are not required to control the game. This embodiment has applications for control of a game on a mobile device such as a smart phone.

Specifically, for the preferred embodiment of a control device with a touch screen and motion sensors there are significant synergies of combining touch and tilt gesture for control of a game that are not disclosed by the prior art. For the embodiment wherein the rendered game output is on the touch screen display of a smart phone, the smart phone can be held in one hand in portrait mode with the screen facing the user, and the users thumb motion of the holding hand on the screen controls an avatar, as a non-limiting illustrative example. Hence, the control method is ergonomically a better experience for the user than prior art control methods for controlling a mobile game. Furthermore, the gesture of tilting the phone to control additional rendered graphical output such as shooting a basketball, football, soccer or other ball as illustrative non-limiting examples, enables a very natural high-fidelity game control compared to the prior art methods of pressing a button. In combination, the touch and tilt gesture control method disclosed herein is a new and novel method to control a game, that is both intuitive for users and has increased fidelity of control compared to prior art methods.

There are at least five significant advantages of the invention:

The method does not involve a complex controller with buttons and/or actuators or video/infrared motion capture.

The control method is intuitive for humans, and is therefore easier to learn than prior art game control systems and hence games are easier to play and/or complex systems are easier to control.

The method overcomes limitations of the noise of the accelerometer and drift of the gyroscope over time, and enables high fidelity control of a game or other system.

An embodiment of the method has biofeedback enabling skill-based sports games.

In a preferred embodiment the control device is held in one hand, the screen facing the user in portrait mode. Hence two hands are not required for control.

The method and system is extensible to control a plurality of games, systems and technologies. These and other aspects, features, and advantages of the present invention will become apparent from the following detailed description of preferred embodiments, which is to be read in connection with the accompanying drawings.

BRIEF DESCRIPTION OF THE DRAWINGS

FIG. 7(a) illustrates a first example embodiment for a single player basketball game, wherein the control device is held in one hand and the avatar is controlled by the thumb motion on the touch sensor of the control device for the running motion of the avatar on the plane of the court and jumping wherein these motions are triggered by a tilting gesture of the control device as in shown in FIG. 3.

FIG. 7(b) illustrates a second example embodiment for a single player basketball game, wherein the control device is held in one hand and the avatar is controlled by the thumb motion on the touch sensor of the control device for shooting and jumping wherein these motions are triggered by a tilting gesture of the control device as in shown in FIG. 3.

FIGS. 14(a)-(d) illustrate an example use for the game of bowling incorporating tilt of the control device forward to bowl and left or right to add spin.

FIGS. 15(a)-(b) illustrate an example use for the game of golf including hand motions of the control device.

FIGS. 16(a)-(b) illustrate an example use for the game of tennis including hand motions of the control device.

FIGS. 19(a)-(b) illustrate an example use for the game of soccer including hand motions of the control device.

FIGS. 20(a)-(c) illustrate an example use for a fishing game including hand motions of the control device.

FIGS. 21(a)-(b) illustrate an example use for a boxing game including hand motions of the control device.

FIGS. 22(a)-(c) illustrate an example use for a third person fighting game wherein the avatar can move in any direction via the touch sensor and the tilt gesture of the control device activates defensive postures and melee or throwing attacks.

FIGS. 23(a)-(c) illustrate an example use for control of a virtual reality tank game simulation.

DETAILED DESCRIPTION OF THE INVENTION

Figure 1:
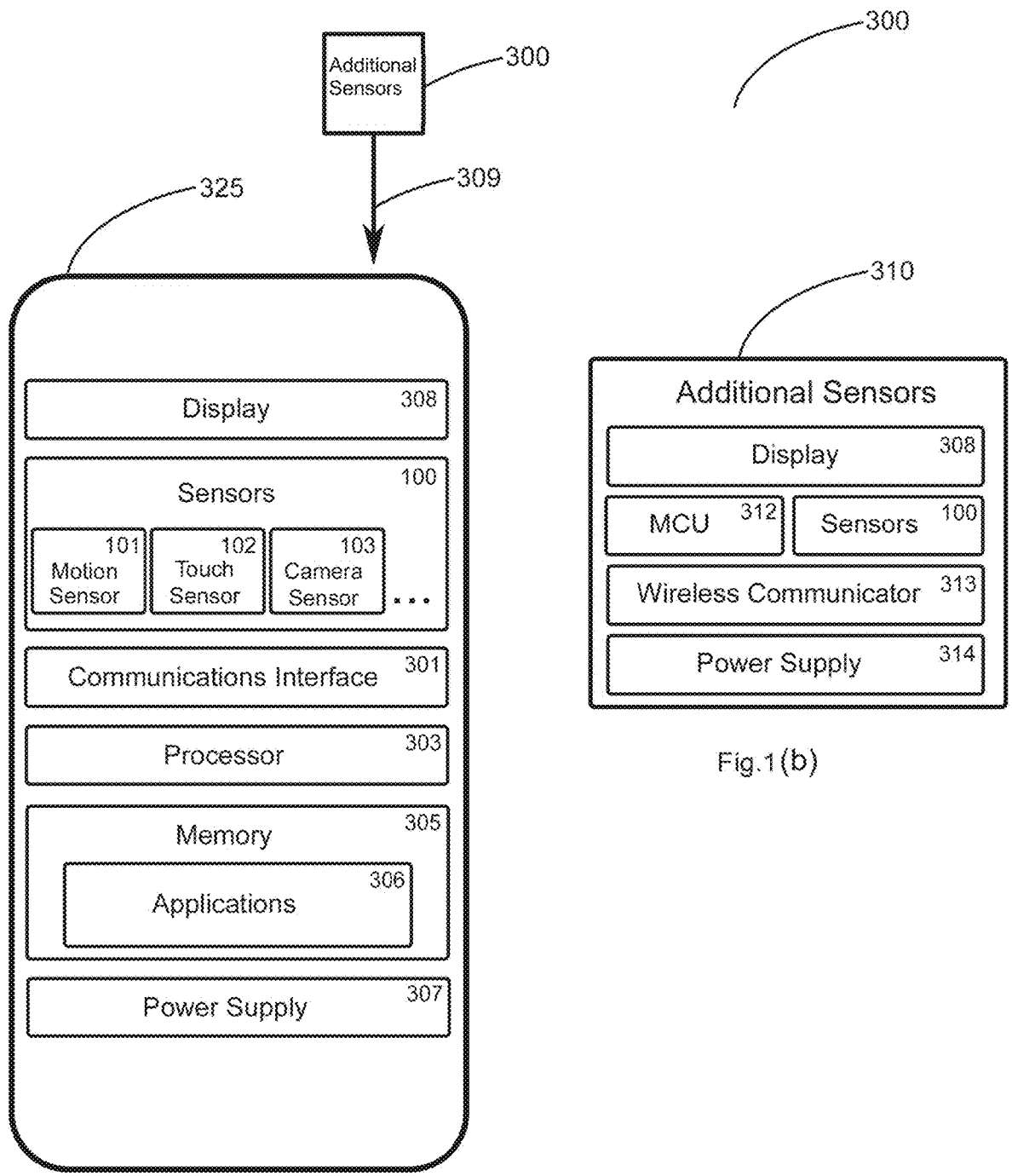
FIG. 1(a) illustrates an example architecture of a control device.
FIG. 1(b) illustrates an example architecture of externally connected sensors.

For clarity and consistency, the following definitions are provided for use herein:

As used herein, a control device refers to a portable device having sensors, including, but not limited to, a gyroscope, accelerometer and a touch sensor. In certain embodiments, the sensors are integral to the control device. However, in other embodiments, the sensors can include external sensors. In certain embodiments the control device may have integrated memory and a processor, and in other embodiments the processing may be enabled in a console or PC based system or other mobile device, connected via a cable or wirelessly to the control device.

As used herein, a display device is any display with the capability to display a web page, 3-D graphics engine output or any other downloadable application. A display device also includes a virtual reality headset with the ability to connect to a control device.

As used herein, a sensor is any device collecting data. Non-limiting examples of a sensor can be a gyroscope, touch sensor, accelerometer, camera, audio input, Doppler depth sensor, infrared motion sensor or thermal imaging camera.

As used herein, an animation is any graphically rendered output for a game, typically rendered by a graphics engine at the appropriate frame rate for a display device. Non-limiting illustrative examples of animations include pictures, lines, shapes, textures, videos, 3D renderings such as moving balls, or 3D rendered avatar movement.

FIG. 1(a) illustrates an exemplary mobile device 325 suitable for embodiments of the invention, which is an Apple iPhone 7 & 7+. The control device 300 includes a display 308, sensors 100, a communication interface 301, a processor 303, a memory 305, and a power supply 307. The communication interface 301 connects various input sensors 100 including a touch sensor 102 integrated into the display 308, accelerometer and gyroscope motion sensors 101, a digital camera 103 and a microphone. The communication interface 301 outputs include the display 308, a built-in speaker, LED flash, and a lightning dock connector port. The processor 303 is an Apple A10 Fusion APL1W24 with M10 Motion coprocessor (SOC) architecture that integrates the main processor, dedicated graphics GPU controller, and other functions such as a memory controller. The motion sensor 101 can include a three-axis gyroscope to measure a rate of rotation around a particular axis and an accelerometer to measure acceleration in three dimensions of the object coordinate system X, Y and Z. The memory 305 includes 32 GB, 128 GB, or 246 GB of flash memory (depending on the model). The memory 305 includes storage for applications 306 ("app") which includes the software of the invention. The power supply 307 includes a rechargeable lithium-polymer battery and power charger.

A representative display 308 usable in conjunction with the present invention is an LED-backlit IPS LCD 750×1334 pixels 16 M colors, with an integrated capacitive 3D touchscreen that is the touch sensor illustrated by 102. A representative motion sensor 101 useable in conjunction with the present invention is M10 Motion coprocessor gyroscope, and the representative accelerometer is the M10 Motion coprocessor. However, it is to be understood that the present invention is not limited to motion or touch sensor or technology currently available. As shown, additional sensors 310 may be connected 308 (wirelessly or via a cable) to the control device 300.

The exemplary mobile device 325 illustrated in FIG. 1 is not limited to the Apple iPhone 7 and 7+. It is to be understood that another suitable control device 300 may be used. For example, the control device 300 could instead be the Samsung Galaxy Series of smart phones (including the Note series). These devices similarly include the communication interface 301, the processor 303, sensors 100, the memory 305, and the power supply 307. The communication interface 301 works substantially the same as the iPhone on the Galaxy series of devices whereas multiple input sensors 100 are also enabled including a 12 Megapixel HDR digital camera, a heart rate sensor, and a built-in speaker with dual noise cancellation microphones. Output devices include a USB/2.0 connecting port, a Type C connecting port, and a headphone jack. The communication interface 301 also controls a touch sensor 102 integrated into the display 306 with enhanced features and sensitivity not requiring the screen to physically be touched to operate. The processor 303 is a Samsung K3RG2G20CMMGCJ 4 GB LPDDR4 SDRAM layered over a Qualcomm Snapdragon 820 with Adreno 530 GPU on a programmable system-on-a-chip (PSOC) architecture with integration for other functions such as the memory controller. The motion sensors 100 include an LSM6DS2 (made by STMicroelectronics) Gyroscope/Accelerometer which include a six-axis (3-axis gyroscope and a 3-axis accelerometer) on the same silicon die together with an onboard Digital Motion Processor (DMP), and measures acceleration in three dimensions X, Y and Z. The memory 305 includes 32 GB and 64 GB of flash models with an internal SD card slot expansion, which can expand memory with an additional 256 GB. The memory 305 includes storage for an application 306 ("app") which includes the software of the invention. The power supply 307 includes a lithium-polymer battery and power charger that can be removed and/or expanded.

FIG. 1(*b*) shows an exemplary external sensor device 310. In this illustrative example, the external sensor device 310 is an activity tracker worn on the wrist and used to track a user's physical activity. An example of such an activity tracker useable for the external sensor device 310 is the Apple Watch 2 activity tracker made by Apple, Inc. The Apple Watch 2 includes a wristband made of a materials ranging from gold, leather, polyurethane and other plastics. The external sensor device 310 can be connected to the mobile device 325 via a wireless communicator 313 which can include a direct Bluetooth connection 309. The external sensors 100 within the SOC chipset include a tri-axial (STMicroelectronics 3 mm×3 mm land grid array (LGA) package featuring a 3D digital gyroscope and accelerometer), and the internal processor 312 is an ultra-low power dual-core S2 chip processor. The power supply 314 includes a rechargeable lithium-polymer battery and is charged through a built-in magnetic dock port, which also is the back cover of the device. It is to be understood that the external sensor device 310 could be another device providing sensor data to the mobile device 325, such as a smart watch, a fitness band, an Oculus Rift virtual reality headset, etc. Furthermore, it is to be understood that the system comprising the mobile device 325, and sensor device(s) 310 in certain embodiments, comprise the control device 300.

The methods and systems described herein are not limited to mobile devices such as Apple and Android smartphones, and the control device is not required to connect to the Internet. The disclosed technology for the sensors, internal or external to the device, is understood to be non-limiting and the quality of the sensor outputs are expected to improve over time. As an illustrative example, the touch screen sensor usable in conjunction with the present invention can be based upon any of various methods such as resistive, capacitive, optical imaging, or other method of touch detection such as a personal computer mouse.

Figure 2:
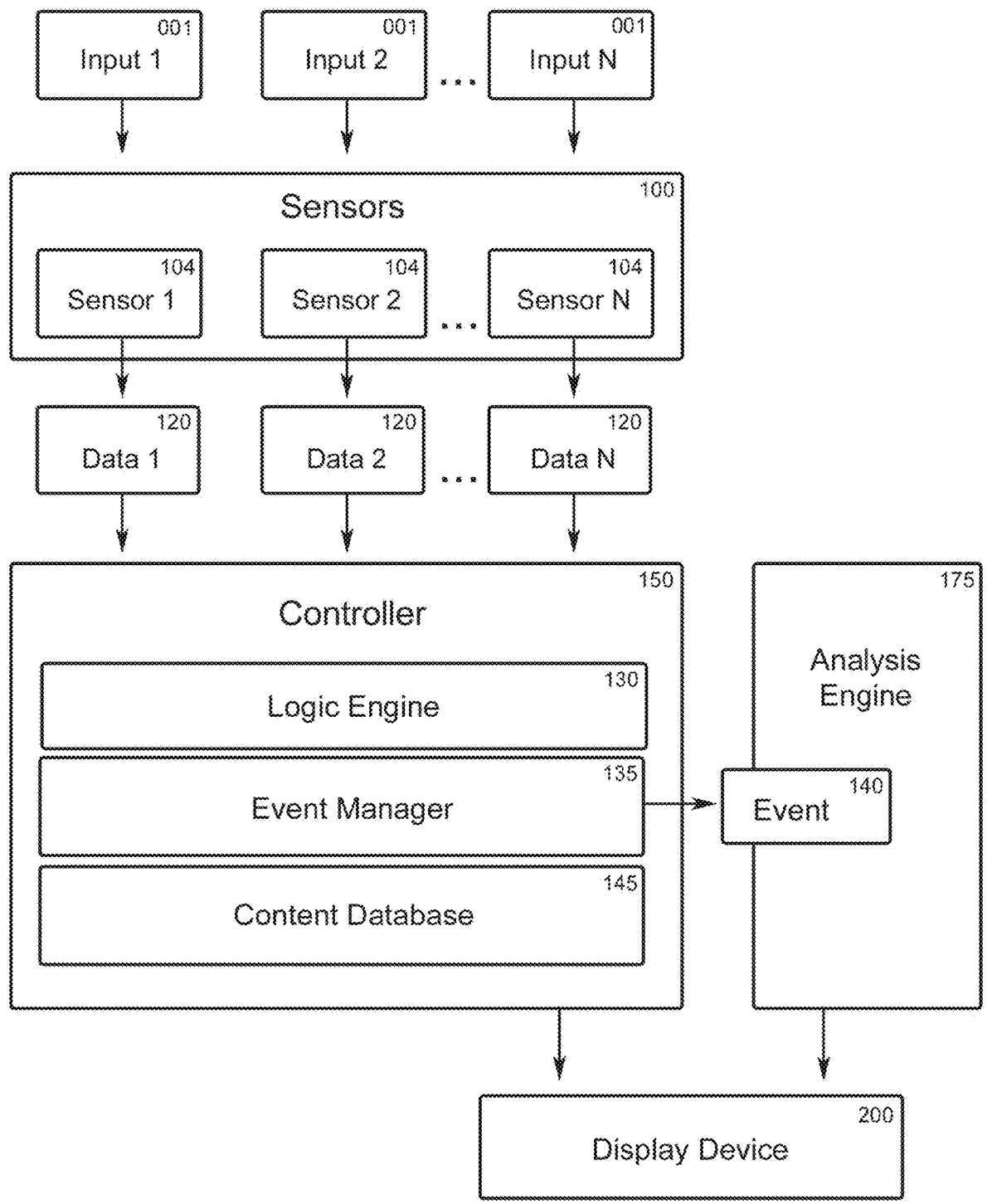
FIG. 2 illustrates an example embodiment of a system of the present invention.

Referring to FIG. 2, an example embodiment of a system of the present invention is illustrated. As will be described in greater detail, an important aspect of the present invention is simultaneous sensor inputs to control a game. FIG. 2 is an embodiment for multiple inputs 001 to sensors 100, wherein the specific sensors 104 generate sensor data 120 that is input to a controller 150. The controller 150 is a processor (game processor) that functionally incorporates a logic engine 130, an event manager 135, and a content database 145. The sensor data input triggers events 140 which via the controller 150 and the logic engine 130 in turn trigger the display of various content from the content database 145, and/or calculation by an analysis engine 175 for dynamic renderings, based upon environmental physics as an illustrative example. Both the controller 150 and analysis engine 175 output to the game display 200 for rendering to the user.

It is to be understood that there may be a multitude of control device sensors, and hence the specific sensors used, and the specific outputs of a sensor used are understood to be non-limiting. It is to be further understood that multiple sensors may be used simultaneously, and that while the invention is illustrated by examples with a single control device 300 the method is extensible to multiple sensors or control devices. As illustrative non-limiting examples, (1) a control device 300 could be held in one hand and additional sensors 310 on a wrist, or (2) a control device 300 could be held in each hand and a sensor 310 in a virtual reality display device headset. These examples are understood to be non-limiting methods and systems of the present invention are extensible to an arbitrary number of sensors attached to different parts of the body, such as the ankles, elbows, knees, and head.

An embodiment of the invention is for simultaneous touch and gesture input to a mobile device 325 in order to control a sports game. While prior art discloses independently (1) touch input and (2) motion gesture input to control a game, there are significant synergies to combining these two previously independent modalities. Preferably, the mobile device 325 is held in one hand in portrait mode, with the screen 308 facing the user. Preferably, in this illustrative embodiment, touch input to the touch screen 308 is by the thumb of the holding hand to control a game avatar movement in any direction, and titling gestures trigger shooting of objects, such as a basketball, soccer ball or other object, displayed 200 on the screen of the mobile device 308 or other external display device 350. Furthermore, the currently disclosed method of gesture analysis enables a game of skill shooting long or short, left, right off the backboard, as an illustrative example for a basketball game. The disclosed invention is therefore a method and system of one-handed control of a game with high-fidelity and overcomes significant limitations of the prior art, which typically requires button and joystick input to a mobile device or controller held with two hands in landscape mode.

These and other novel elements of the invention will become apparent from the following detailed description of the invention in the context of control of a sports game for basketball and then with respect to other sports games including football, bowling, soccer, baseball and tennis. However, it is to be understood that the following examples are not meant to be limiting.

Basketball Game Embodiment

Figure 3:
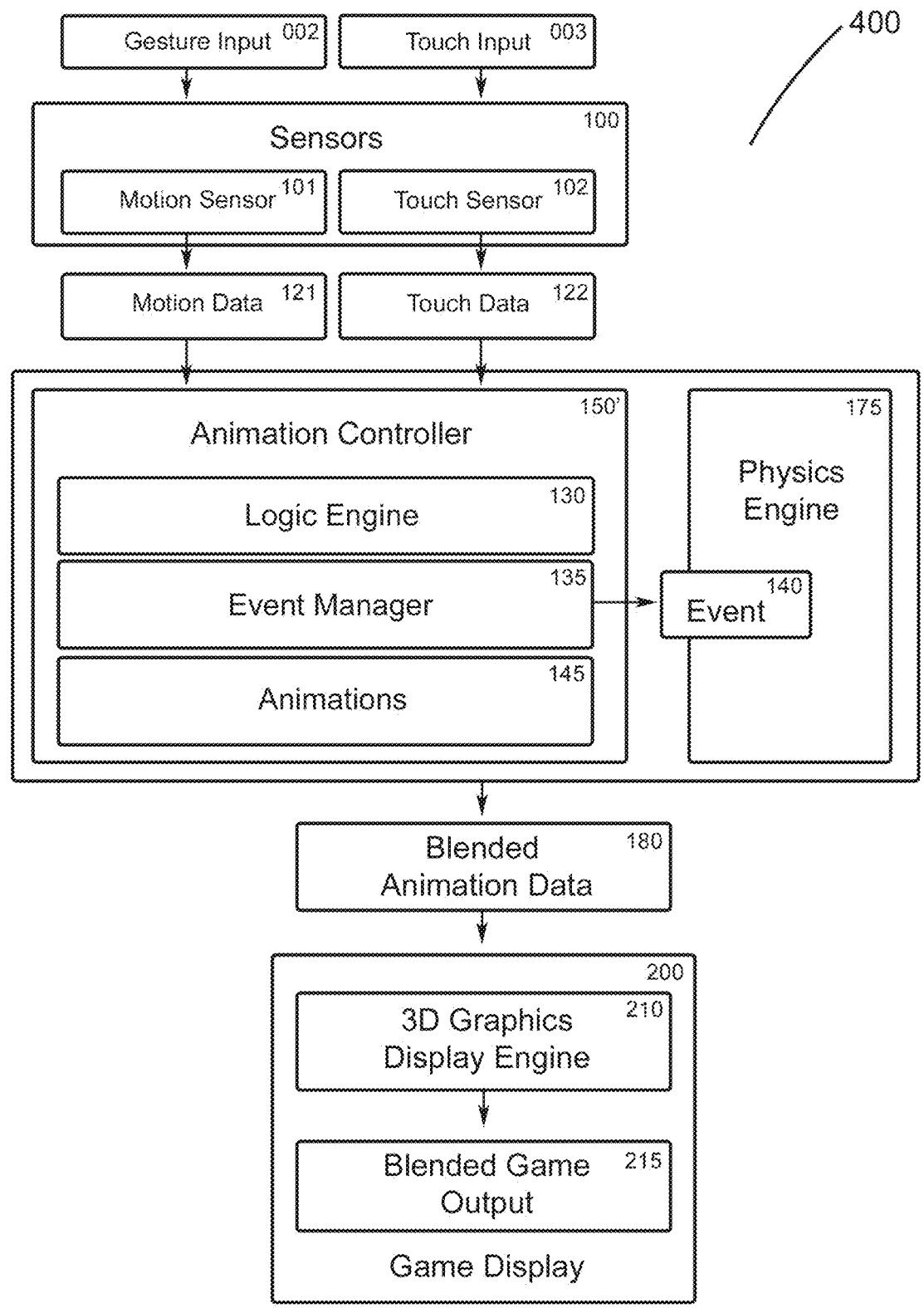
FIG. 3 illustrates an example embodiment of a system of the present invention for a sports game with simultaneous one-handed gesture and touch input.

Referring to FIG. 3, an example embodiment 400 of the invention for a basketball game is illustrated. In this case, the "input 001" is gesture 002 and touch 003 detected by respective motion sensors 101 and touch sensors 102, which may be simultaneously input. The "sensor data 120" (motion data 121 and touch data 122, respectively) is then input to the "animation controller 150," which in a preferred embodiment is the animation controller 150 of a graphics engine, such as Unity 5.3.4. Preferably the logic engine 130 uses a layered logic tree of a branching animation controller. As shown, the "content database 145" is a database of animations 145 which can include video or graphical elements.

The animation controller 150 detects specific basketball-related events such as dribbling across the court, arm movements, shooting a ball or attempting to block a shot (events 140) based in part upon the sensor inputs 002 and 003, the logic of the layered logic trees used by the logic engine 130, and listener protocols used by the event manager 135. As an example, a thumb input 003 such as a screen swipe to move a player on the court sensed by the touch sensor 002 will trigger an event 140 in the animation controller 150 to push a specific animation from the database 145 for rendering and display 200 by the 3D graphics display engine 210. For a gesture input 002, the logic engine 130 creates an event 140 that triggers the physics engine 175 to render a ball flight simulation and an animation 145' related to the event 140 (a basketball shot, for example). An important aspect of the present invention is the use of multiple concurrent sensor 100 inputs to control a game and the resulting blended animation data 180 that results from in blended game output 215 rendered on the game display 200.

The inventive method is illustrated in more detail through various examples. FIGS. 4 to 7 detail the gesture and motion inputs of an embodiment to control an avatar for fluid and high-fidelity continuous basketball game play. In a preferred embodiment the control device 300 is held in portrait mode by one hand of a user 010 with the touch input enabled by the thumb of the holding hand and the gesture input enabled by the wrist of the holding hand. The method for holding the control device is not limiting however, and a larger control device, such as a tablet computer (e.g., Apple iPad) could be held in both hands with one thumb or finger providing touch input and both hands providing gesture input.

FIGS. 4(a)-(b) illustrate the gesture to shoot the basketball in the exemplary embodiment. FIG. 4(a) shows a gesture tilting the control device 300 through an angle 005 denoted by θ. In an embodiment the change of pitch with time gyroscope sensor output is the angular velocity, or the derivative of the angle θ with respect to time, denoted by $\dot{\theta}$ 006. A significant aspect of our inventive method is to make the maximum angular velocity $\dot{\theta}$ from the gesture proportional to the initial velocity of a virtual object, a shot basketball or thrown football as illustrative examples.

FIG. 4(b) illustrates a left/right titling gesture through an angle 008 denoted by α of a control device 300. The combination of the gestures FIGS. 4(a) and (b) and their respective sensor inputs enable control of shots with high fidelity input to a physics engine wherein the ball flight can be rendered in virtual 3D space with depth proportional to $\dot{\theta}$ 006 and with left/right direction proportional to α 008.

An additional feature of the invention is a feedback meter 155, illustrated in an embodiment in FIGS. 4(a)-(b). The magnitude of the angular velocity 006 is rendered dynamically in order to give the user 010 visual biofeedback on the shot 050. In a preferred embodiment, a range 007 indicating the speed for a good shot is illustrated on the feedback meter 155. The user 010 attempts to make the shot gesture angular velocity such that the feedback meter 155 registers with the angular velocity 006 in the ideal range 007. These gestures have a higher percentage of going in the basket. FIG. 4(b) shows the feedback meter with angle α 008 indicated by an icon. Hence the feedback meter 155 provides biofeedback in two dimensions, shot speed and angle, in this illustrative non-limiting exemplary embodiment. It is to be understood that for those skilled in the art, many different embodiments are possible for the feedback meter 155, and that the shape of the feedback meter 155 or other design features for the display of the feedback shown are non-limiting.

Figure 4:
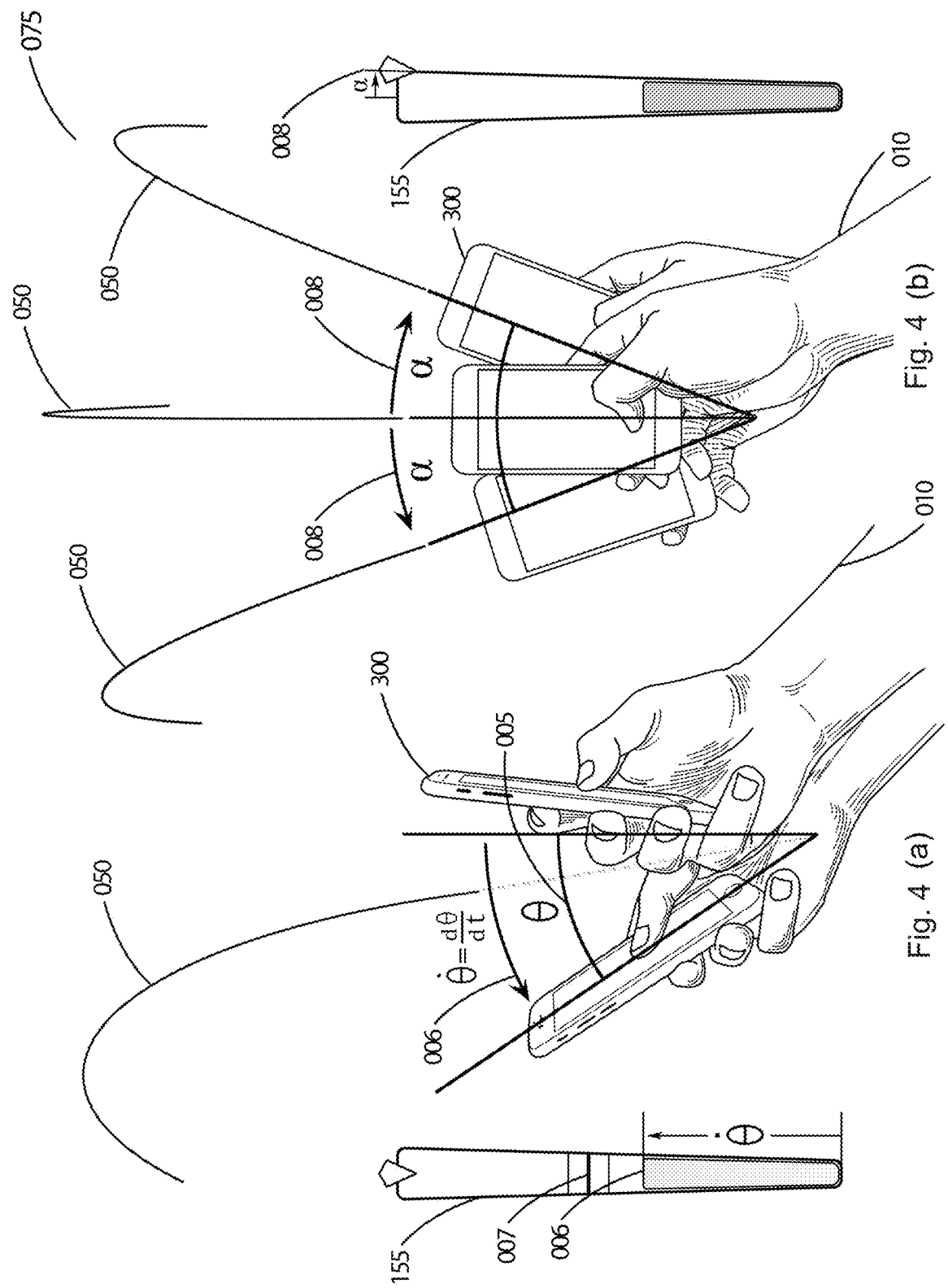
FIG. 4(a) illustrates an example of a straight tilt gesture using the control device, along with an example feedback meter providing feedback to the user as to the strength and direction of the gesture.
FIG. 4(b) illustrates an example of a left, right or straight tilt gesture using the control device, along with an example feedback meter providing feedback to the user as to the strength and direction of the gesture.
Figure 5:
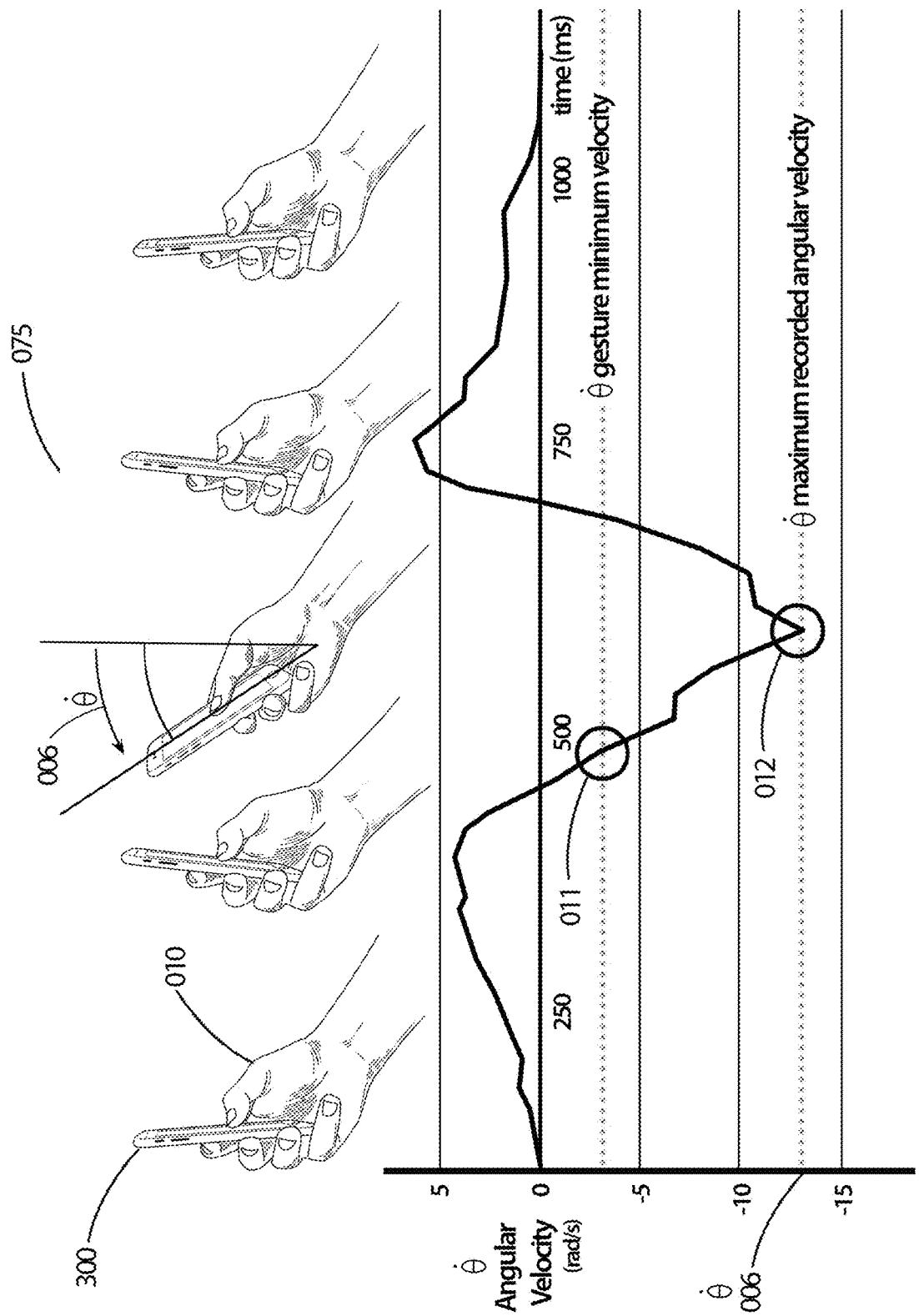
FIG. 5. illustrates example angular velocity data corresponding to the gesture shown in FIG. 4(a) obtained from gyroscope sensor data.

FIG. 5 illustrates angular velocity $\dot{\theta}$ 006 data (change in pitch with time) from an iPhone 6 gyroscope sensor as a function of time corresponding to the shooting gesture embodiment of FIG. 4(a). Human motor function naturally takes the control device back slightly before motioning forward. An embodiment of the method detects an event 140 of a shot when the angular velocity 006 is less than a predetermined threshold, −3 radians/sec in the embodiment illustrated in FIG. 5. The maximum negative rotational velocity 006, corresponding to the maximum speed of the gesture, is scaled and input to the physics engine 175 to render the arc of the ball flight 050.

It is customary in the art to place an orthogonal coordinate system (X, Y, Z) on the control device 300 such that Y is along the long axis of the device, X is perpendicular to Y and is on the short axis, and Z is perpendicular to both X and Y. Motion sensor 101 outputs are then referenced relative to this object coordinate system.

Figure 6:
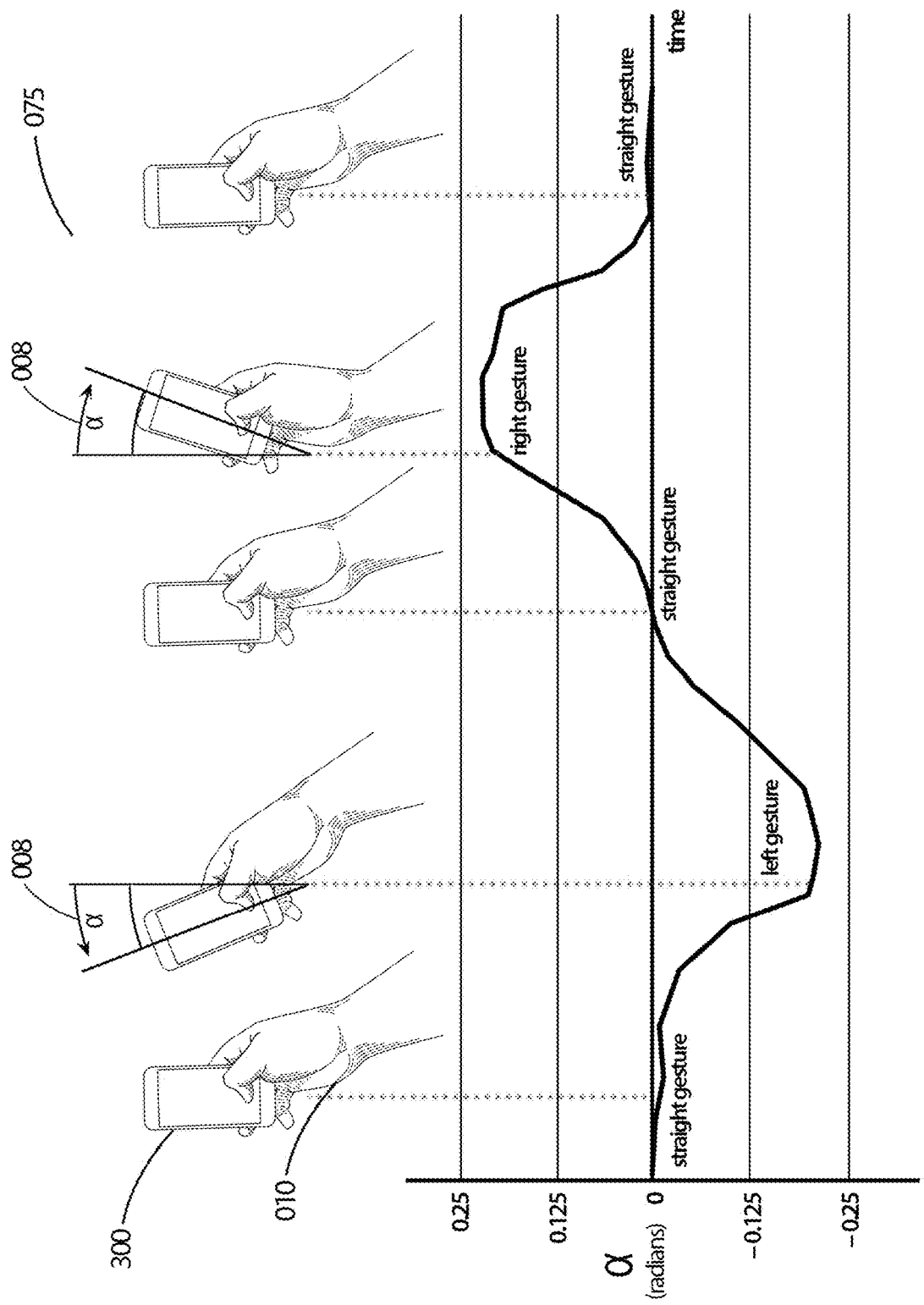
FIG. 6. illustrates example angular rotation data corresponding to the gesture shown in FIG. 4(b) obtained from accelerometer sensor data.

FIG. 6 illustrates our preferred embodiment to measure the left/right motion of a control device 300 utilizing X acceleration motion sensor data that is smoothed by a software low pass filter. An advantage of using X acceleration is that the device does not require calibration.

Sensor Kinetics by Innoventions, Inc. has a sensor fusion gravity sensor, which produces similar data output to that shown in FIG. 6. Gravity data is typically isolated from raw accelerometer data by removing the "user acceleration" segment (or acceleration imparted on the device by the user) using a low-pass or Kalman filter or sensor fusion algorithms developed by InvenSense and others. Our preferred embodiment utilizing X acceleration sensor data smoothed via a low pass filter is therefore similar to an X gravity sensor. Gravity data has the advantage of always pointing towards the center of the earth; hence motion utilizing gravity data are a priori oriented in space.

As the control device 300 is rotated in space, the rotation can be detected from the X, Y, Z gravity data ($g_X$, $g_Y$, $g_Z$). Typical gravity data outputs of motions sensors 101 have maximum ranges from +9.8 m/sec² to −9.8 m/sec². The magnitude of the X earth gravity vector $g_X$ is related to the angle α 008 by:

$$g_X = g \sin(\alpha), \tag{1}$$

so that $\alpha = \arcsin\left(\dfrac{g_X}{g}\right)$.

In a first order Taylor series approximation $\sin(\alpha) \approx \alpha$ so that:

$$g_X = g \sin(\alpha) \approx g\, \alpha.$$

Hence, $g_X/g \approx \alpha$. Therefore, gravity sensor data $g_x/g$ is approximately equal to the angle α 008 in radians. FIG. 6 therefore illustrates our preferred embodiment wherein we synthesize $g_X$ gravity data, by applying a low pass filter to smooth the X accelerometer data, and then set $g_x/g \approx \alpha$ where g=1. Our preferred embodiment is accurate for many types games and requires minimal computation, however for even higher fidelity the angle α can be calculated from Equation (1). It is to be understood that these examples are illustrative, and the exact motion sensors, or combination of fused motion sensor outputs, is not limiting.

FIG. 6 illustrates smoothed X acceleration data, in units of g (9.8 m/sec$^2$), from an iPhone 6 for straight—left—straight—right—straight gestures as a function of time. In an embodiment the angles α denoted by the dashed lines in FIG. 6, are made proportional to the angles of basketball shots rendered by the physics engine 175 on the game display 200.

FIG. 7(*a*) illustrates the combination of sensor 100 inputs with touch 070 and gesture 075 to a control device 300. In a preferred embodiment, the touch motion 070 is used to direct placements of an avatar on the screen of a display device. The touch motion 070 can be continuous and be performed in any direction. Similarly, the shoot gesture 075 can be at any time. In this exemplary illustration the corresponding blended game output 215 is that of a basketball player in a virtual basketball court moving 079 left, then becoming stationary, then moving right controlled by the corresponding touch input 070, and then executing a right leaning jump shot 080 triggered by a gesture 075. The animation 145 rendered from the content database is selected based upon the logic engine 130 rules given the sensor data 120 input. FIG. 7(*a*) illustrates a feature of the invention wherein for the simultaneous thumb motion 070 right and shoot gesture 075 the system 400 renders a corresponding right running jump shot animation, illustrated by 080 in FIG. 7(*a*). As an additional example, FIG. 7(*b*) illustrates 071 a circular thumb gesture coming to a stop, followed by a shot gesture 075. In an embodiment the system 400 renders a corresponding circular running animations 081, then a straight standing shot, illustrated by 085 in FIG. 7(*b*).

As shown, touch and gesture controls can simultaneously control an avatar for running and shooting during a virtual basketball game. In a preferred embodiment the touch input is understood to be continuous, with the shot gesture 075 occurring at any time by the user 010. An aspect of the invention is that no virtual joystick is rendered on the display 308 of the control device 300. The touch motion is instead centered about the last point the finger or thumb was placed on the control device touch sensor. Furthermore, a preferred embodiment has hundreds of animations in the content database and the simultaneous gesture and touch sensor inputs trigger a multitude of animations which are rendered as blended game output, where illustrative non-limiting examples include dunking, crossovers and spin moves. Hence, the exemplary illustrations are to be understood as showing a very small subset of possible gestures, movements and events for an actual virtual basketball game.

Figure 8:
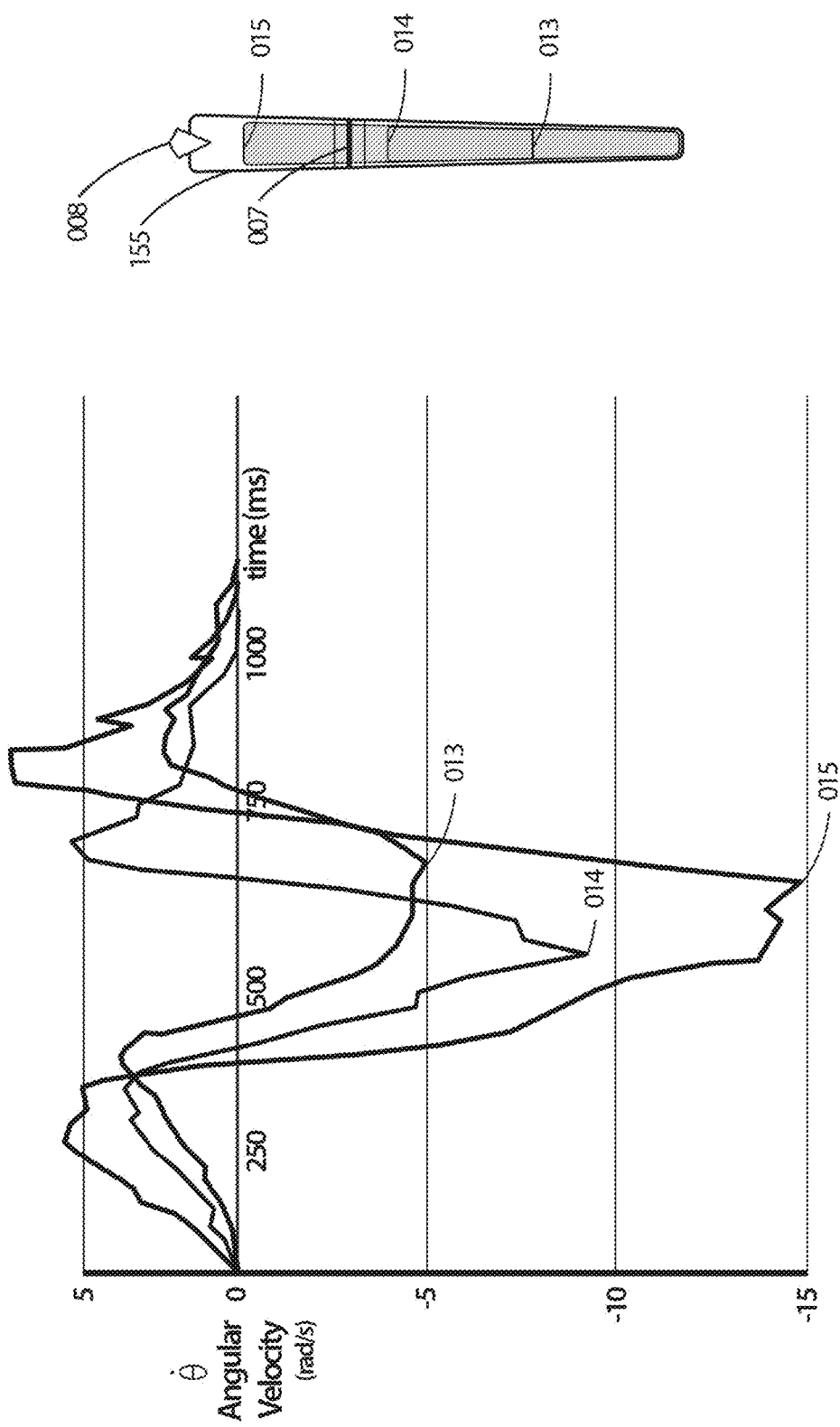
FIG. 8 illustrates a feedback meter which provides feedback regarding the magnitude of the angular velocity corresponding to a short, a long and an average tilt gesture.

An additional and important aspect of the invention is the graphical feedback meter 155 that is updated periodically proportional to the magnitude of the sensor 100 inputs. Preferably the updates occur at the frame rate of the system 400 and the feedback meter effectively dynamically registers the strength of a gesture 075. FIG. 8 illustrates an embodiment of a feedback meter 155 for three different strength shooting gestures 075, with maximum angular velocities denoted by 013, 014, and 015 which are rendered on the feedback meter 155 corresponding to short 013, good 014 and long 015 shots. Hence the feedback meter 155 provides the user 010 with visual feedback corresponding to the strength of the gesture 075. In a preferred embodiment, the feedback meter 155 is rendered on the display 308 of the control device 300. For the embodiment of a sports game, the feedback meter 155 visual biofeedback enables the gesture motion 075 to be trained as a game of skill, with repeatability of the output game display 200 for given inputs 001 driven by the high-fidelity of the method and system 400 disclosed herein.

Figure 9:
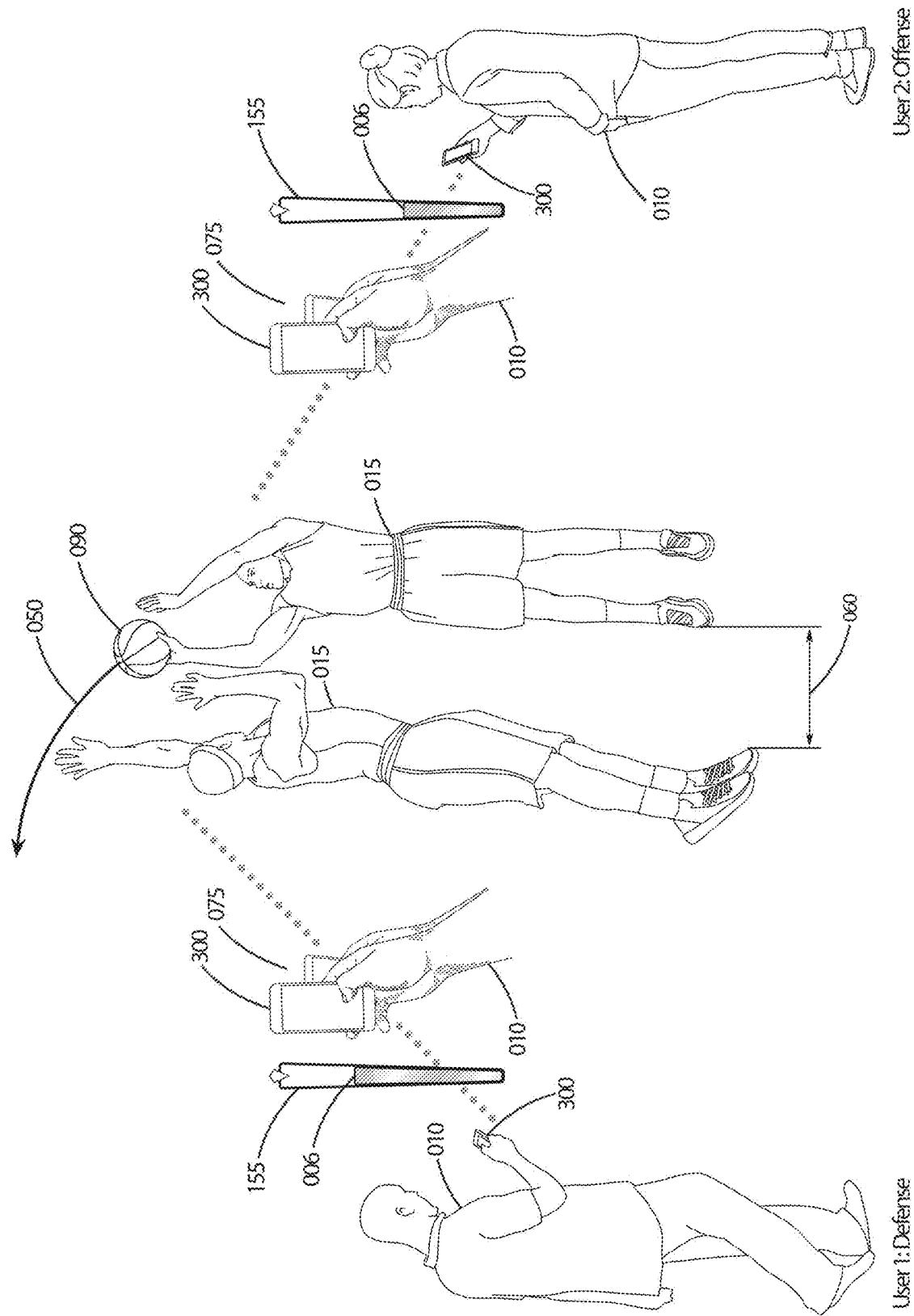
FIG. 9 illustrates an example use of the invention for control of a multiplayer one-on-one basketball game with both offense and defense control shown.

The method and system 400 are not limited to a single player basketball shooting game. FIG. 9 illustrates an exemplary embodiment with two users 010 playing a one-on-one basketball game. In the illustrated embodiment, User 1 is playing defense whereas User 2 is playing offense. In an embodiment User 2's control method is as described previously. User 1 may use a similar control methodology wherein motion of the avatar 015 is via touch control and blocking is via the gesture 075. This example is non limiting however, and in an embodiment the defensive player may have the ability to steal the ball using a left right angular tilt, similar to the exemplary illustration FIG. 6.

A feature of the invention, illustrated in the embodiment of FIG. 9, is the feedback meter 155 which in an embodiment can be rendered on each of the respective users display devices. For the User 2 the feedback meter 155 provides feedback on the strength and directions of basketball shots by the offensive avatar. For User 1, the feedback meter provides feedback on the strength of blocks. In an embodiment, and as an illustrative example, if the offensive and defensive avatars are far apart on the court, denoted by the distance 060, then a faster (or stronger) gesture 075 is required to block the shot, which in an embodiment triggers a higher avatar jumping animation.

Figure 10:
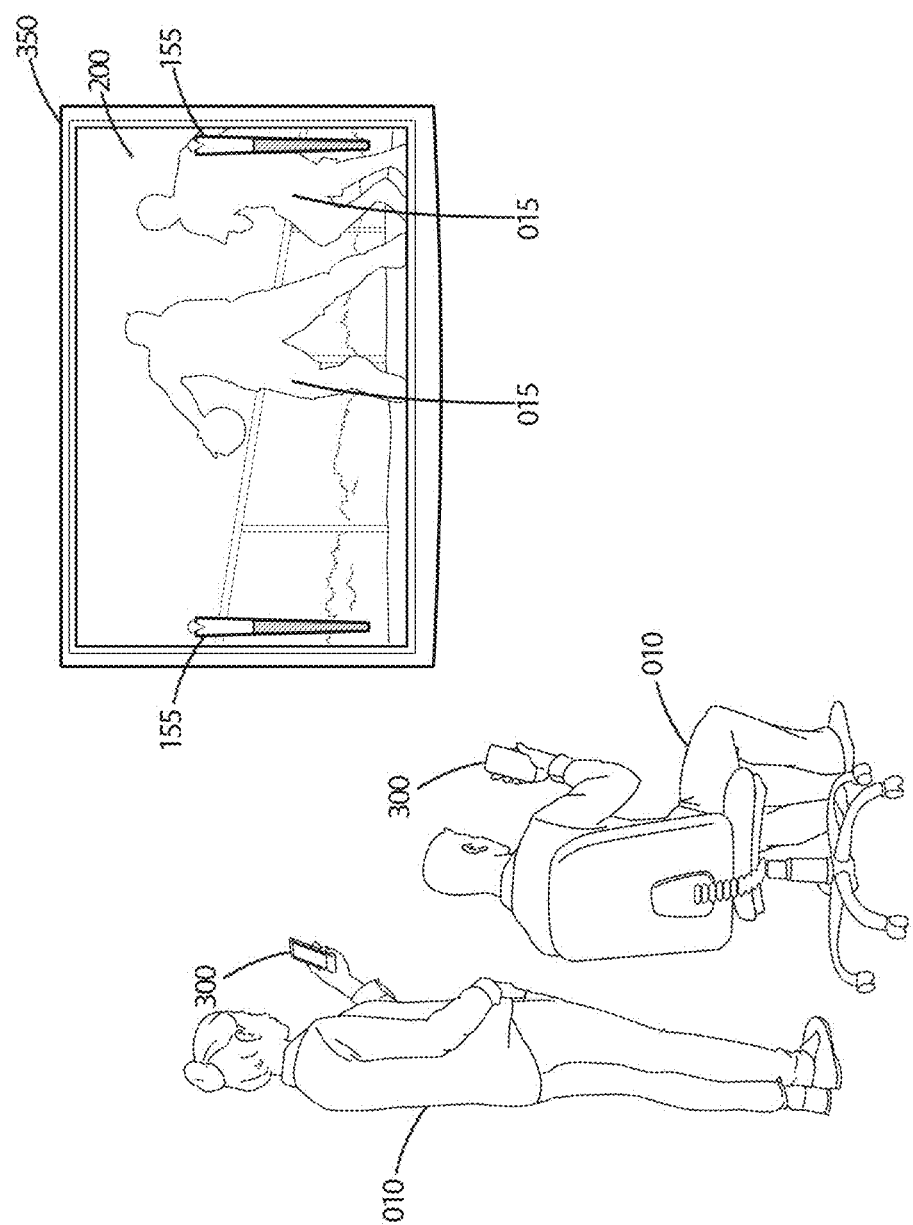
FIG. 10 illustrates an example embodiment of a basketball game wherein the control device controls an avatar on a display device separate and distinct from the control device.

The blended game output 215 and feedback meter 155 are not limited to rendering on the display 308 of the control device 300. FIG. 10 illustrates an alternate embodiment of a basketball game wherein the control device 300 controls an avatar 015 on a display device 350 separate and distinct from the control device, wherein the avatar motion, shooting physics rendering 050 and feedback meter 155 are displayed 200 separate and distinct from the control device 300.

The invention has at least three embodiments incorporating a control device 300 and a display device 200: (1) the control device 300 is also the display device 200, such as a mobile smart phone (2) the control device 300 is connected to an external display device 200, via a cable, Bluetooth or other local area network, and (3) the control device 300 is connected to the display device 200 via a cloud-based gaming platform 500. In the embodiment (2) the display device maybe connected to a gaming console such as a PlayStation 4 or Xbox One, or a personal computer (PC). In embodiment three (3) it is to be understood that the display device and control device are internet enabled, whereas in the other two embodiments, (1) and (2), the display and control device are not required to be connected to the internet. Hence, the connection method of the control device to the display device is understood to be non-limiting.

Cloud-Based Gaming Platform Embodiment

Figure 11:
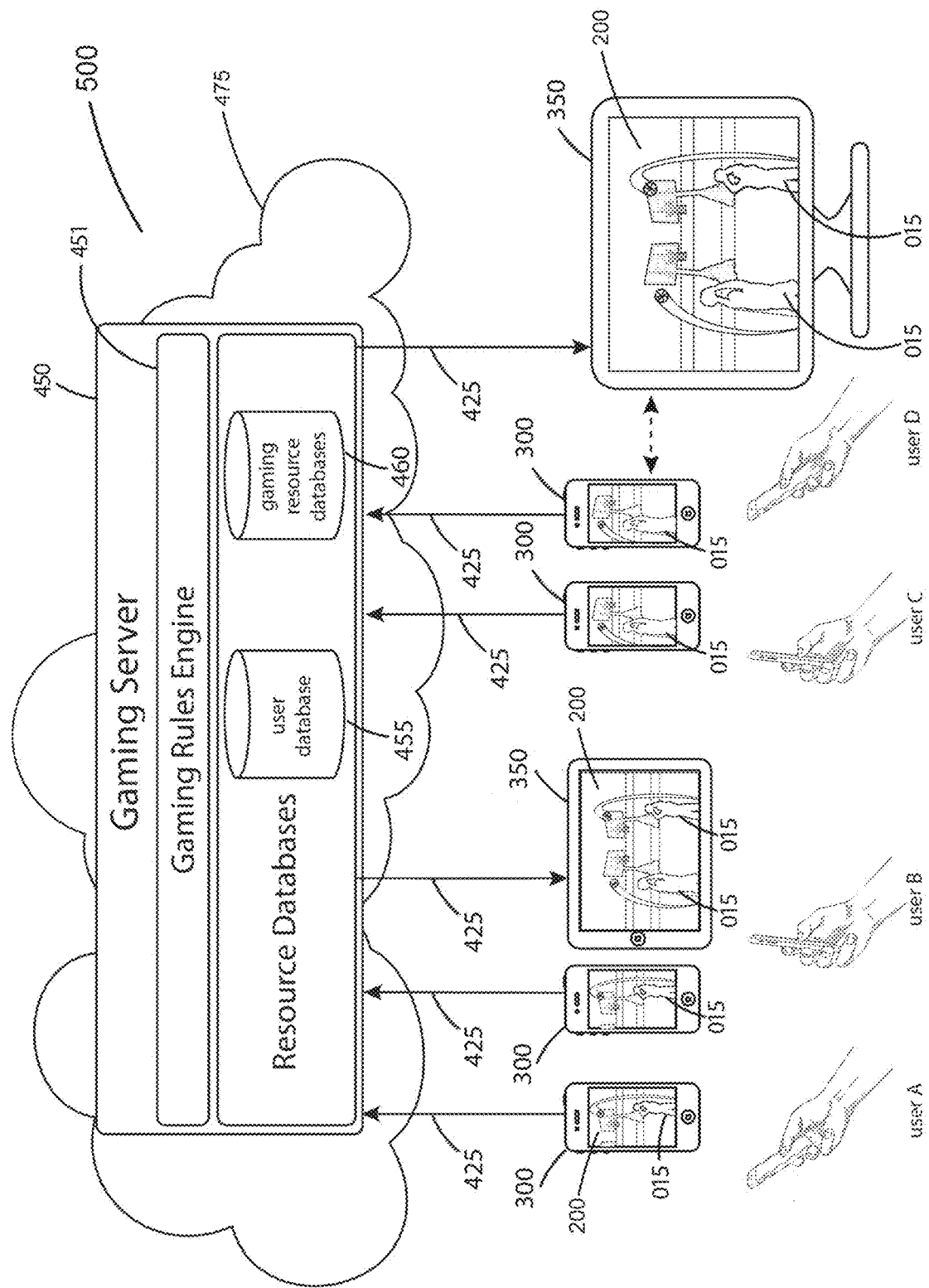
FIG. 11 illustrates an embodiment of a cloud-based multiplayer game platform incorporating multiple player control devices and display devices wherein there are multiple sensor inputs from the respective control devices.

FIG. 11 illustrates an exemplary architecture of a gaming platform 500 incorporating the motion state control method 250, according to an embodiment of the present invention. The gaming platform 500 is disclosed in U.S. Pat. No. 9,022,870 entitled "Web-Based Game Platform with Mobile Device Motion Sensor Input" to Jeffery et al., the content of which is incorporated herein by reference in its entirety.

As shown, the three major components of the gaming platform 500 are the control devices 300, a gaming server 450, and display devices 350. The gaming server 400 includes a gaming rules engine 451 that manages a plurality of games being played. As shown, the gaming rules engine 451 has access to a user database 455, and a gaming resources database 460. The user database 455 stores login information and game information. For basketball, the game information can include data for each shot made during the game, the player's current score, current level number, etc. The gaming resources database 460 can include graphical content for simulating the game on the display device 350.

In the illustrated embodiment, the gaming server 450 is cloud-based enabling global connectivity via the Internet 475. For each user, the user's control device 300 and display device 350 can be simultaneously connected to the gaming server 500 through separate and distinct Internet connections 425. Preferably, the internet connections 425 in FIG. 11 are via the web-socket protocol. The control device 300 transmits data, including sensor 100 data 120 and other data to the gaming server 500; in turn, the gaming server 500, facilitates display of gaming media at the display 350 through a separate Internet connection. In an embodiment, a gaming graphics engine 420, in the form of a software application, can be pushed or downloaded to a suitable Web-enabled display device 350 where a substantial amount of the logic of the gaming rules engine 450 is encoded, and the gaming logic engine 420 can then perform much of the work otherwise to be performed directly at the gaming server 450. In an alternate embodiment, the gaming graphics engine 420 is a downloadable application, an App, to the display device 350, and the application can communicate with the gaming server 450 via the internet 475.

Illustrative Preferred Embodiments

In the description of the present invention, exemplary methods for performing various aspects of the present invention are disclosed. It is to be understood that the methods and systems of the present invention disclosed herein can be realized by executing computer program code written in a variety of suitable programming languages, such as C, C++, C#, Objective-C, Visual Basic, and Java. It is to be understood that in some embodiments, substantial portions of the application logic may be performed on the display device using, for example, the AJAX (Asynchronous JavaScript and XML) paradigm to create an asynchronous web application. Furthermore, it is to be understood that in some embodiments the software of the application can be distributed among a plurality of different servers.

It is also to be understood that the software of the invention will preferably further include various web-based applications written in HTML, PHP, Javascript, XML and AJAX accessible by the clients using a suitable browser (e.g., Safari, Microsoft Edge, Internet Explorer, Mozilla Firefox, Google Chrome, Opera) or downloadable and executable as a stand-alone application to a suitably con-FIG.d display device. Furthermore, the graphics engine software maybe one of Unreal, Unity, GameMaker or other software system capable of rendering 2D and/or 3D graphics on a display device 350.

In a preferred embodiment where the display device 350 is the control device 300, we use the Unity 3D game engine primarily for the implementation of the system 400. For the alternate preferred embodiment of the cloud-based system 500, preferably we install Unity on both the control device 300 and display device 350, and use the web-socket protocol to communicate via the gaming server 450.

Preferably Unity 5 with a frame rate of 30 frames per second, such that the system 400 is updated every 33 msec., is used. However, the frame rate is limited by the computing power of the control device 300 and display device 350, so that we anticipate higher frame rates in the future.

Gesture Sensing

For gestures of the type corresponding to FIG. 4(a) we preferably use the Unity call "Input.gyro.rotationRateUnbiased" which returns unbiased rotation rate as measured by the control device 300 gyroscope sensor 101. The rotation rate is given as a Vector3 representing the speed of rotation around each of the three axes in radians per second.

For gestures of the type corresponding to FIG. 4(b) we preferably use the Unity call "Input.acceleration" which returns the last measured linear acceleration of a device in three-dimensional space. The value is given as a Vector3 representing the acceleration on each axis in g's (a value of 1 g corresponds to 9.8 m/sec$^2$).

The gesture recognition and analysis for the basketball game embodiment is performed as follows:

1) Measure and store input gyroscope data via the call Input.gyro.rotationRateUnbiased, for the gesture FIG. 4(a).

2) Measure the input acceleration data via the call Input.acceleration, for the gesture FIG. 4(b). Store an adjusted acceleration X-axis value by performing a linear interpolation from the previously stored value and the current measured value. The interpolation value used is the time elapsed from the previous frame multiplied by a scale factor "accelerometerX=Mathf.Lerp(accelerometerX, Input.acceleration.x, accelerometerLerpSpeed*Time.deltaTime)"

3) Check if the gyroscope measurement meets a minimum instantaneous rotation threshold, −3.5 rad/sec in the basketball embodiment, if yes, begin the gesture co-routine.

4) The gesture co-routine performs its own task every frame as follows:

(a) Store a new variable for the peak rotation velocity during this shot gesture. Initially populate this variables with the instantaneous sensor measurements for the frame the co-routine was started.

(b) For the duration of this co-routine, preferably 250 ms in the basketball embodiment, compare instantaneous gyroscope measurements to the stored peak values, replacing peak values with the instantaneous measurements if they are larger.

(c) Store a new variable for the peak x-axis acceleration during this shot gesture. Initially populate this variables with the instantaneous sensor measurements for the frame the co-routine was started.

(d) For the duration of this co-routine, preferably 250 ms in the basketball embodiment, compare the absolute value of the instantaneous accelerometer measurements to the absolute value of the stored peak values, replacing peak values with the instantaneous measurements if they are larger.

(e) Co-routine is finished once the maxima are located, the stored peak values are final, and is passed to the PlayerShotCalculator class to create a target position and trajectory for the shot. The stored peak gyro value is used to adjust the target position forward/back, and to increase/decrease the ball flight time. The stored peak x-axis acceleration is used to adjust the target position left/right.

Touch Sensing

Touch input to the control device is straight forward and preferably uses the Unity APIs Input.GetMouseButton- Down, GetMouseButton and Input.mousePosition: GetMouseButtonDown returns true only on the frame the user first pressed the mouse button or touched the screen, GetMouseButton returns true every frame while the button is held down or a touch remains on the screen, and Input.mousePosition returns the pixel coordinates of a touch or mouse position.

To capture touch movement every frame we check if the user begins a touch with GetMouseButtonDown (0). If yes then store the touch position with Input.mousePosition. We then check if the user continues to touch the screen with GetMouseButton(0). We then compare the current touch position with the touch position stored when the touch first began. If the user is no longer touching the screen, we reset relevant values to 0. The advantage of this method is a virtual joystick that is always centered where the user first touches the screen. If the user is no longer touching the screen, it will be re-centered wherever the user begin touching again.

Animation Database

The database 145 of the system 400 preferably comprises various graphical and animation files. Preferably animations are encoded in a FBX (filmbox) and encode texture, mesh, bone, and animation data. The animations are captured from human movements via a motion capture (MOCAP) studio. Representative MOCAP systems include VICON, QUALISIS, Xsens, Optitrack, and IPI.

The method to capture, clean and import MOCAP FBX files into a graphic engine, such as Unity 5, is well known to those skilled in the art. Furthermore, the method of animation control via a blended logic tree is also well known to those skilled in the art. The inventive method disclosed in the preferred embodiment herein, however, is to use multiple sensor 100 inputs to control the animations 145 wherein the input control includes simultaneously both touch and gesture.

The illustrative embodiments of the disclosed method do not require Unity however. As an illustrative example on Android devises, access to the gyroscope is done with SensorManager's getDefaultSensor (Sensor.TYPE_GYROSCOPE) in the SDK. Touches are accessed by the MainActivity by overriding the onTouchEvent(MotionEvent event) method and Touches are accessed by a view by registering a View.OnTouchListener with the view's setOnTouchListener( ). Hence the platforms (IOS/Android), SDK, calls, and graphics engine and are non-limiting to the method disclosed herein.

Gaming Platform

For the cloud-based game platform 500 embodiment, we implement the method 250 as a native application 306 for both Apple IOS and Android control devices 300. Data capture on an Apple Device is enabled via the Apple iOS CMMotionManager object to capture device motion data, attitude, accelerometer and gravity. We use the Gravity method of CMAcceleration subclass of CMDeviceMotion object to capture the gravity sensor data. We use the Attitude method of CMAttitude subclass of CMDeviceMotion object to capture the attitude sensor data. We call startDeviceMotionUpdatesToQueue:withHandler method of the CMMotionManager object to begin the data capture. Data is captured at 1/100th of second's intervals. We set the data capture interval using deviceMotionUpdateInterval property.

In a preferred embodiment 500, the gaming engine 450 is implemented using Amazon web services, and the web-enabled display 350 for all major commercially available compatible web browsers (Firefox and Safari). Preferably, we use the Unity 5 graphics engine called from the application 306 and in an embodiment install Unity 3D 5 in an appropriate HTML 5.0 web page of the display device 350. In an alternate preferred embodiment, the Unity 5 graphics engine is compiled as a stand-alone native application and downloaded to the display device, wherein the application has the ability to connect to the internet via the web-socket protocol and receive input data from the control device 300 via the gaming server 450.

We communicate data in the platform 500 using web socket connections. The control device 300 uses the WebSocket API to send data to the gaming server 450, and the browser 350 where the Unity 3D graphics engine is installed on the control device 300 and the web-enabled display 350. A web socket connection with the browser is persistent for the duration of a played game.

We use the WebSocket API to receive data from the control device 300 and communicate with the Unity game engines. As an example, when UnityAndroid completely loads, it sends a callback to our native app "gameLoadedOnDevice( )". In the UnityWeb case, it sends a socket call back to a native browser app. The native browser app sends back the details of the play result, to UnityWeb by calling unity.sendMessage("unity function"). To replicate the device's behavior on the web-enabled display 350, UnityAndroid or UnityiOS does all the socket communication with the server via the native app only. Appropriate methods are defined in the native app 306 that handles the socket calls. Unity just calls the respective methods whenever needed. The response to network calls is also listened for by the native app and it communicates these data back to Unity via unity.sendMessage("unity function").

The method 400 algorithm keeps running in the background when a user 010 starts the UnityAndroid or UnityiOS. Whenever the method 400 detects sensor 100 input and subject to the logic 130, the method 400 sends the trigger event 140 to the UnityAndroid or UnityiOS and web socket call to UnityWeb. It is to be understood that the software and systems calls disclosed in this preferred embodiment will change in the future, and therefore the embodiment is non-limiting.

For clarity in the basketball example, we illustrated the method using a single control device 300 with integrated sensors 100; however this example is non-limiting.

In-Stadium Game Embodiment

Figure 12:
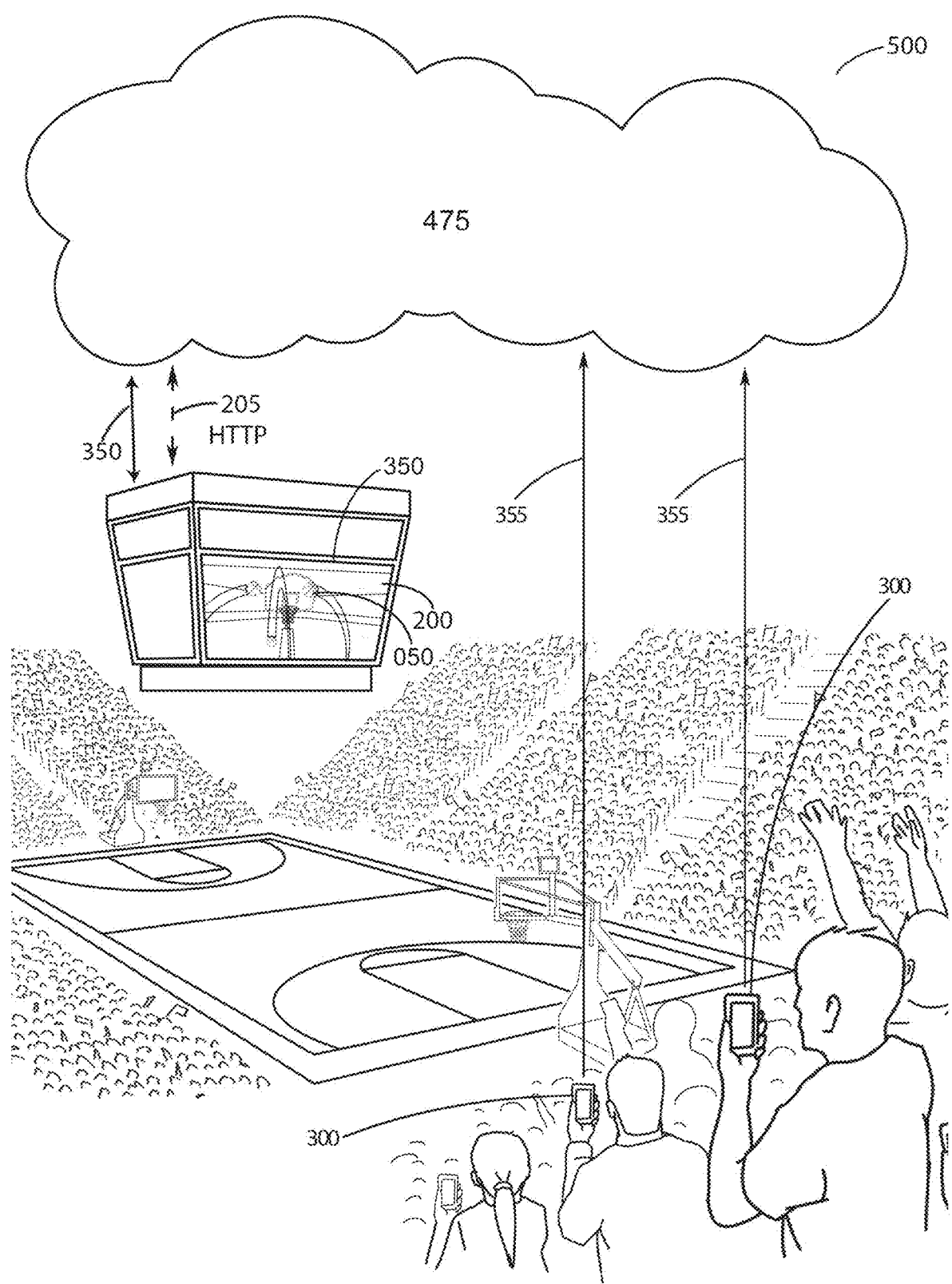
FIG. 12 illustrates an embodiment of the method and system of FIG. 10 for a multiplayer sports game with multiple users' game outputs displayed simultaneously on the digital board in a stadium.

U.S. Published Patent Application 2016/0260319 entitled "Method and System for a Control Device to Connect and Control a Display Device" to Jeffery et al., the contents of which are incorporated herein by reference in their entirety, has previously disclosed multiple users playing a sports game simultaneously on a digital board in a stadium. FIG. 12 is an exemplary illustration of the embodiment of many (e.g., several thousands) users 010 simultaneously utilizing the same display device 350 wherein the control device utilizes the inventive control method 400 disclosed herein. As depicted, the display device 350 is a very large display such as a digital board in a basketball stadium, e.g., a JumboTron™. Digital boards are known as the largest non-projection video displays, commonly used in stadiums, marketing screens, scoreboards and at big events.

These screens were originally made of 16 or more small flood-beam CRTs (cathode ray tubes) and ranged from 2 to 16 pixels. The newest model JumboTron and Jumbovision screens are now large-scale LED displays. Both the newer and older versions enable multiple device connections and can be connected with various audio and video formats. These systems can display almost any type of format connected with any of the following: VGA, DVI, HDMI and Coaxial with USB connectivity on the latest systems. That is, JumboTrons can project computers, smartphones, Blu-ray players, and other digital devices. Hence, it is straight-forward to display a game output 200 of the invention, such as a web-page in an embodiment, on a JumboTron, and create a display device 350 for 1000's of simultaneous users. However it is understood that the example is illustrative and non-limiting.

The mode of play for the embodiment illustrated in FIG. 12 is for users 010 to play simultaneously on the large display 350, making basketball free throw shots as an illustrative example using the gesture 075 and method 400, illustrated in FIG. 4, with their respective control devices 300. The gaming server 500 keeps track of the respective users shots and "winners" are determined by the rules of the game, which may be consecutive baskets in 60 seconds for example. Note that the game play on the display device 350 is not limited to users 010 in the stadium. In an embodiment, previously disclosed by Jeffery, of a live telecast event users in homes, bars, restaurants, hotels or elsewhere can simul-taneously play on the display device 350 in the stadium from their respective geographic location, wherein in the new embodiment the control method is the inventive method 400 disclosed herein. Hence, in this embodiment, the inventive method and system 500 is applicable to millions of simul-taneous users in different geographic locations.

Illustrative Sports Game Embodiments

In the following description we illustrate a multitude of possible variations of the present invention to video and mobile games such as football, bowling, tennis, baseball, hockey, soccer, fishing, and a third person fighting game. These examples are understood to be illustrative and non-limiting. For brevity, we disclose embodiments via the respective touch and gesture inputs and corresponding ava-tar 015 game output 200 for each example, since these sensor 100 inputs and the method 400 enable the game output 200. Where applicable, we point out unique features of the invention illustrated by the specific embodiments.

Figure 13:
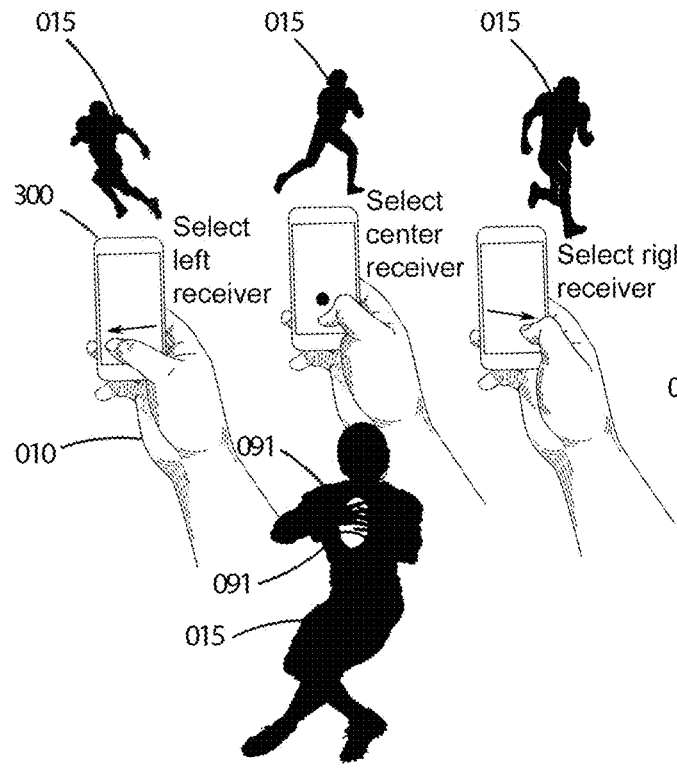
FIGS. 13(a)-(d) illustrate an example use for the game of American Football including hand motions of the control device.
Figure 13:
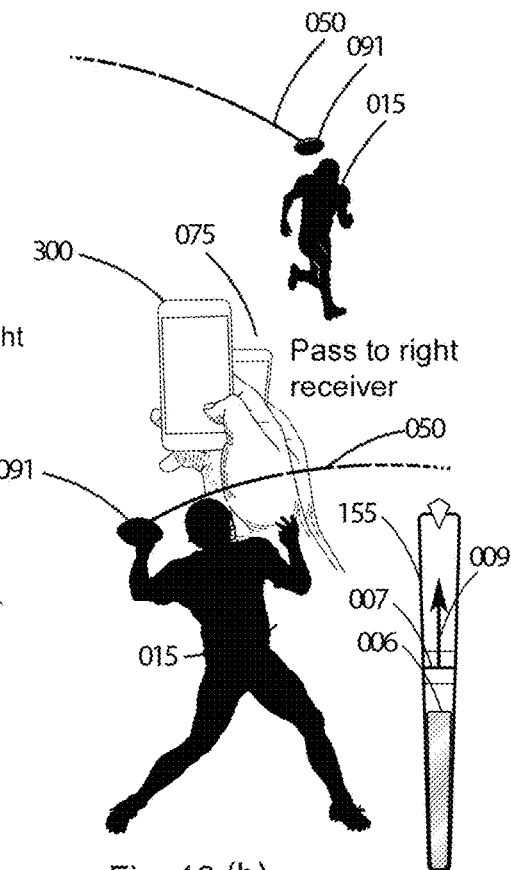
Figure 13:
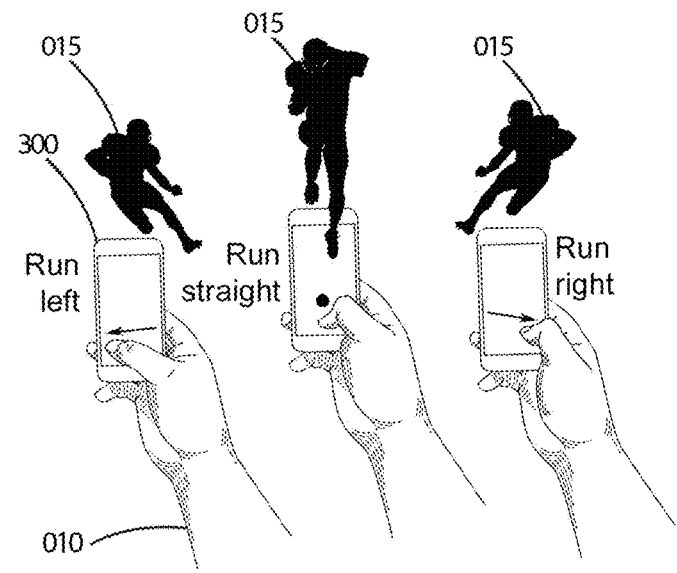
Figure 13:
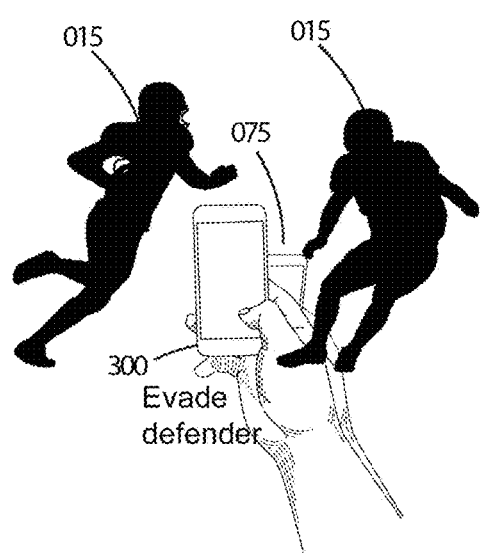

FIGS. 13(*a*)-(*d*) illustrate an embodiment for control of an avatar quarterback (QB) in a football game. FIG. 13(*a*) illustrates touch motions to first select a virtual running receiver (left receiver, right receiver, and middle receiver). FIG. 13(*b*) illustrates gesture motions for a pass to a receiver wherein the angular velocity 006 of the gesture 075 shown is proportional to the length of the pass. A feature of the football game embodiment is the feedback meter 155, wherein the selected receiver corresponds to a range 007 of ideal throw on the feedback meter 155. In this feedback meter 155 embodiment, illustrated in FIG. 13(*b*), as the receiver runs down the field the ideal throw range 007 moves 009 on the feedback meter, proportionate to the receiver's distance from the QB. Hence, in the embodiment, the ideal gesture has a small angular velocity for a receiver close to the QB, and a larger angular velocity 006, and the ideal pass is indicated on the feedback meter 007 that is changing on the feedback meter 155 in time, proportionate to the motion of the receiver on the field. FIG. 13(*c*) illustrates motion for the QB, receiver, or other player with continuous control for running via touch sensor input. FIG. 3(*d*) is gesture input 075 triggering jumping, juking, tackling or other animated event.

FIGS. 14(*a*)-(*d*) illustrate an embodiment of the invention for control of a bowling game. FIG. 14(*a*) illustrates touch motions for alignment of the avatar 015 on the bowling lane. FIG. 14(*b*) illustrates an aspect of the invention for the bowling embodiment wherein left right tilt (yaw) of the control device 300 aims the bowling ball 092 left, right, or middle denoted by the respective graphical lines 052, 053, and 054. Preferably, however, rendered as a single line with angle proportional to the yaw angle of the display device 300 rendered responsively on the display device 350. In an alternate embodiment the direction of the aim line 060 can also be selected by a touch input. FIG. 14(*c*) illustrates the gesture 075 to bowl the ball in the direction denoted by the aim line 053 wherein the angular velocity 006 is propor-tional to the speed of the ball. FIG. 14(*c*) also illustrates an embodiment of the feedback meter 155 for the bowling game, where the ideal bowling speed is a range illustrated by 007. FIG. 14 (d) illustrates two exemplary aspects of the bowling game preferred embodiment, wherein after the throw the spin of the ball is controlled proportionate to the yaw angle of the control device 300. The exemplary embodi-ment illustrates graphical lines for three different spins 055, 055 and 057. In a preferred embodiment for bowling, a single graphical line 008 is rendered on the display device 350 and is updated dynamically responsive to the yaw angle of the control device 300. Note that this graphical line is an alternate embodiment of the visual feedback meter 155.

FIGS. 15(*a*)-(*b*) illustrate an embodiment of the invention for control of a golf game. FIG. 15(*a*) illustrates touch motions for alignment of the avatar 015 on a virtual golf hole, wherein continuous touch input to the control device 300 aims continuously left, right, or middle denoted by the respective graphical lines 059. Preferably, however, ren-dered as a single line 059 with direction proportional to the touch sensor input to the display device 300 and rendered responsively on the display device 350. FIG. 15(*b*) illus-trates the golf swing controlled by the gesture 075 illustrated in FIG. 4(*b*), with angular velocity 006 proportional to the golf club speed and angular acceleration 008 proportional to straight 059, hook 058 and slice 060 of the golf ball 094 rendered flight. In the embodiment FIG. 15(*b*) the ideal golf shot speed is indicated by the range 007 in the visual feedback meter 155.

FIGS. 16(*a*)-(*b*) illustrate an embodiment of the invention for control of a tennis game. FIG. 16(*a*) illustrates touch motions for movement of the avatar 015 on a virtual tennis court, wherein continuous touch input to the control device 300 controls the avatar movement in any direction on the virtual court, wherein preferably the magnitude of the touch movement input is proportional to the running speed of the avatar. FIG. 16(*b*) illustrates the tennis swing controlled by the gesture 075 illustrated in FIG. 4(*b*), with angular velocity 006 proportional to the racquet speed and angular accelera-tion 008 proportional to straight, hook and slice of the tennis ball 095 rendered flight. In the embodiment of FIG. 16(*b*) the ideal tennis shot speed is indicated by the range 007 in the visual feedback meter 155, wherein preferably the range 007 changes dynamically based upon the location on the court.

Figure 17:
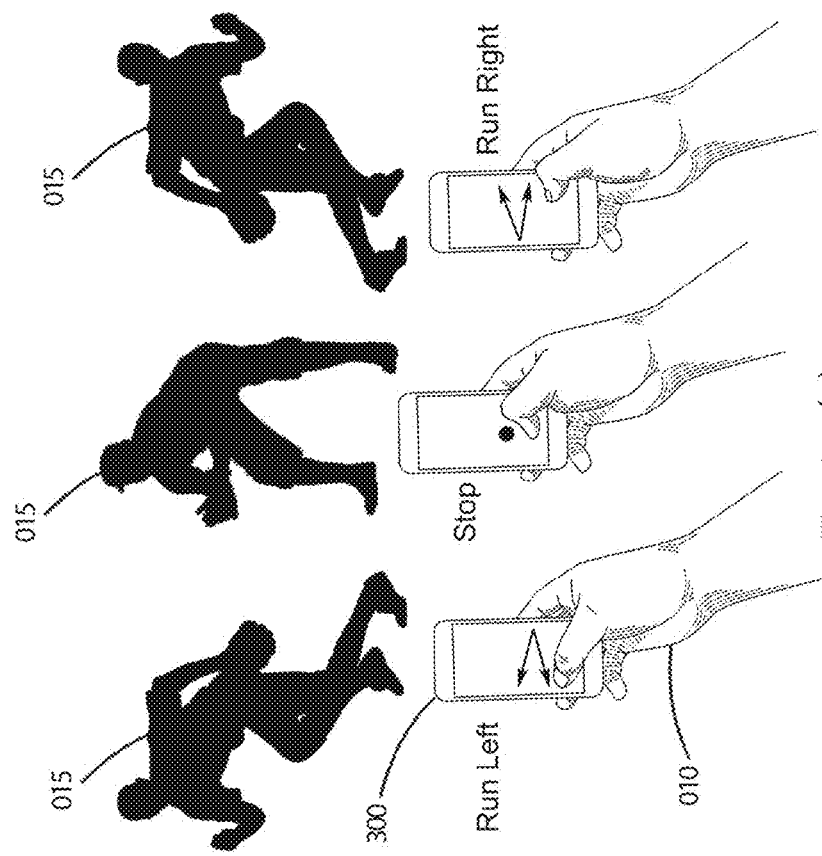
FIGS. 17(a)-(c) illustrate an example use for the game of baseball including hand motions of the control device.
Figure 17:
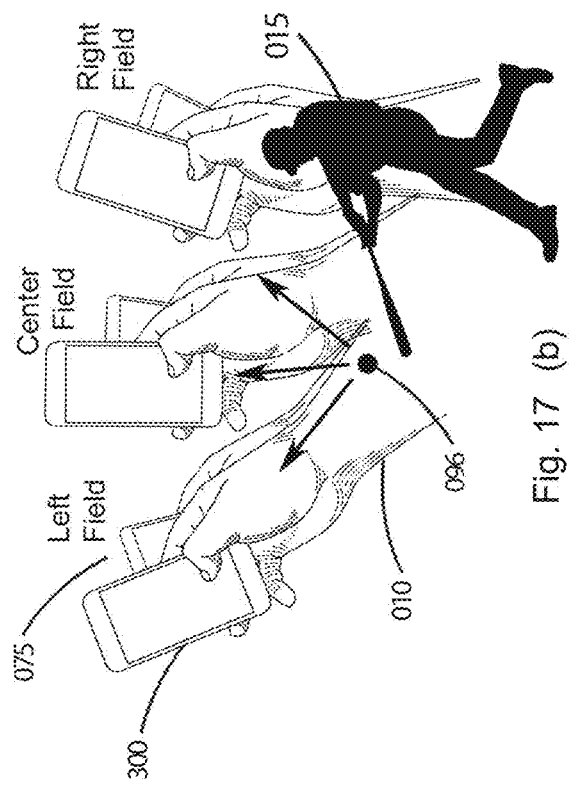
Figure 17:
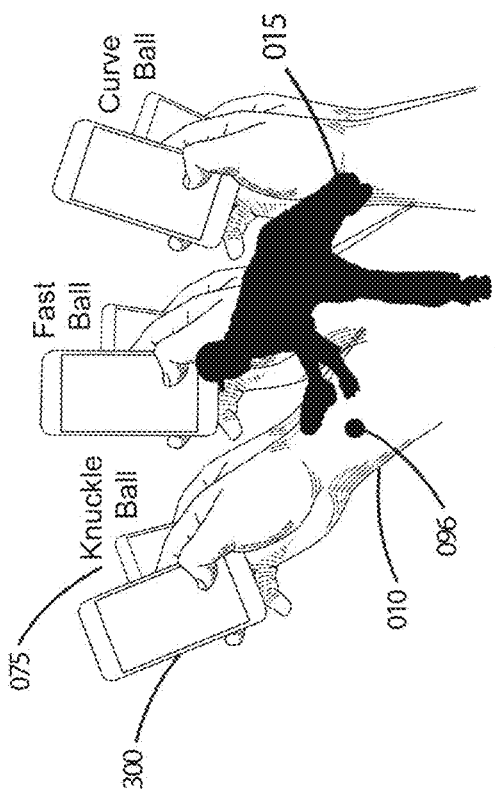

FIGS. 17(*a*)-(*c*) illustrate an embodiment of the invention for control of a baseball game. FIG. 17(*a*) illustrates touch motions for movement of the avatar 015 on a virtual baseball field, wherein continuous touch input to the control device 300 controls the avatar movement in any direction on the virtual baseball field, wherein preferably the magnitude of the touch movement input is proportional to the running speed of the avatar. FIG. 17(*b*) illustrates an embodiment of an avatar 015 baseball swing controlled by the gesture 075, illustrated in FIG. 4(*b*), with angular velocity 006 propor-tional to the baseball bat speed and angular acceleration 008 proportional to straight, hook and slice of the baseball 096 rendered flight into center, left or right field respectively. FIG. 17(*c*) illustrates avatar 015 pitching controlled by the gesture 075, with control device 300 angular velocity 006 proportional to the pitch speed and angular acceleration 008 corresponding to various ball 096 pitch types: knuckle ball, fastball and curve ball as illustrative non-limiting examples.

Figure 18:
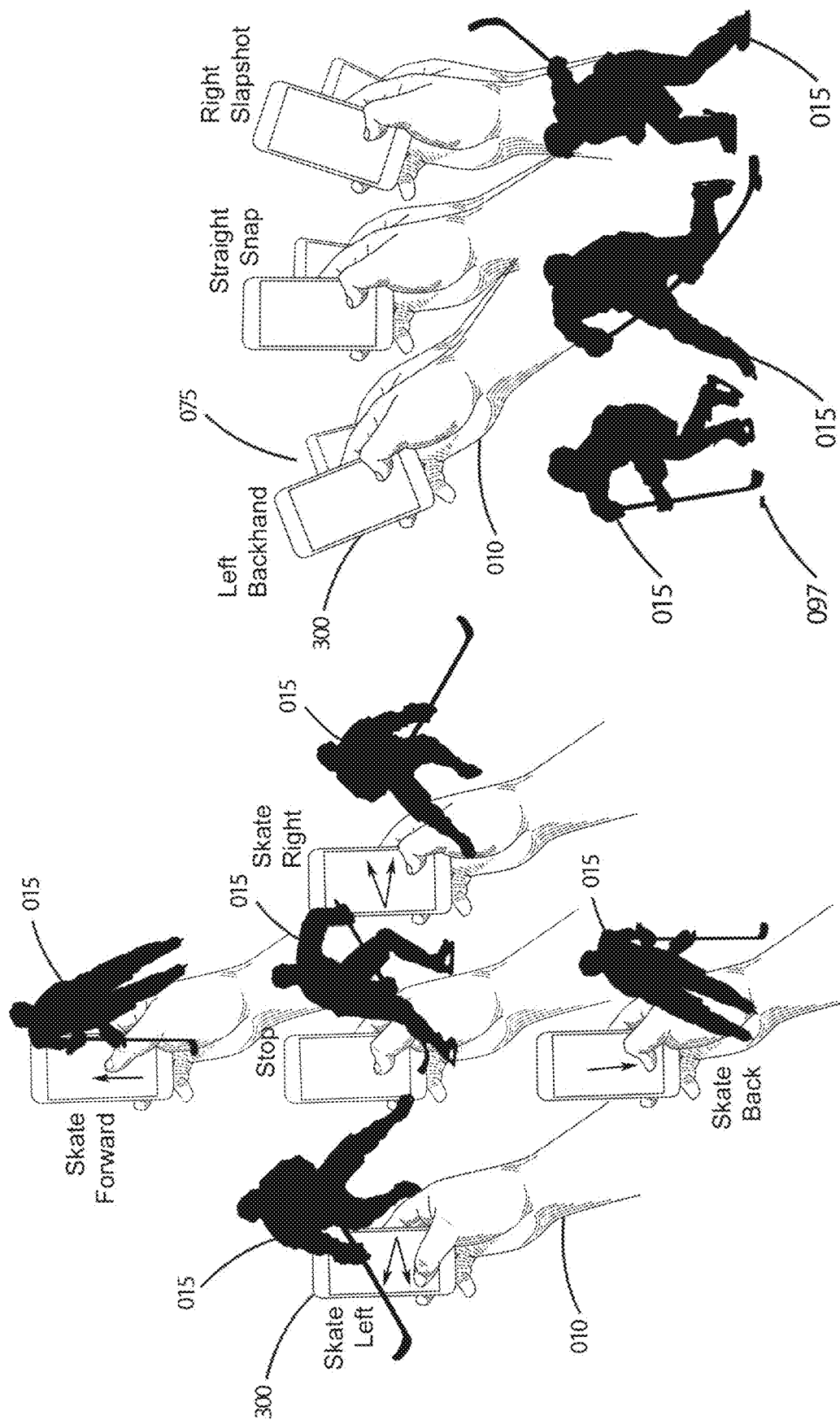
FIGS. 18(a)-(b) illustrate an example use for the game of hockey including hand motions of the control device.

FIGS. 18(*a*)-(*b*) illustrate an embodiment of the invention for control of a hockey game. FIG. 18(*a*) illustrates touch motions for movement of the avatar 015 on a virtual hockey rink, wherein continuous touch input to the control device 300 controls the avatar movement in any direction on the ice, wherein preferably the magnitude of the touch movement input is proportional to the skating speed of the avatar. FIG. 18(*b*) illustrates an embodiment of an avatar 015 hockey shot controlled by the gesture 075, with angular velocity 006 proportional to the hockey stick head speed and angular acceleration 008 proportional to straight, hook and slice of the hockey puck 097 rendered flight as backhand, snap and slapshots, respectively, as illustrative non-limiting examples.

FIGS. 19(*a*)-(*b*) illustrate an embodiment of the invention for control of a soccer game. FIG. 19(*a*) illustrates touch motions for movement of the avatar 015 on a soccer field, wherein continuous touch input to the control device 300 controls the avatar movement in any direction on the field, wherein preferably the magnitude of the touch movement input is proportional to the running speed of the avatar. FIG. 19(*b*) illustrates an embodiment of an avatar 015 soccer kick controlled by the gesture 075, with angular velocity 006 proportional to the initial soccer ball 098 speed and angular acceleration 008 proportional to straight, hook and slice of the soccer ball 098 rendered flight as outside, straight and standard shots respectively, as illustrative non-limiting examples.

FIGS. 20(*a*)-(*c*) illustrate an embodiment of the invention for control of a fishing game. FIG. 20(*a*) illustrates touch motions for reeling in a fish by an avatar 015, wherein continuous touch input to the control device 300 in a circle simulates winding the fishing reel. FIG. 20(*b*) illustrates an embodiment of an avatar 015 casting the fishing rod controlled by the gesture 075 and angular acceleration 008 proportional to left, right or straight casts of the fishing rod, illustrated in FIG. 20(*b*).

FIGS. 21(*a*)-(*b*) illustrate an embodiment of the invention for control of a boxing game. FIG. 21(*a*) illustrates touch motions for movement of the avatar 015 in a boxing ring, wherein continuous touch input to the control device 300 controls the avatar movement in any direction in the ring, wherein preferably the magnitude of the touch movement input is proportional to the stepping speed of the avatar. FIG. 21(*b*) illustrates an embodiment of an avatar 015 punching controlled by the gesture 075, with angular velocity 006 proportional to the boxing glove speed and angular acceleration 008 triggering left, right or jab/uppercut punches, as illustrative non-limiting examples.

FIGS. 22(*a*)-(*c*) illustrate an embodiment of the invention for control of a third person fighting game wherein the avatar can move in any direction via the touch sensor input, FIG. 22(*a*) and left right gestures of the control device, illustrated in FIG. 22(*b*) activates defensive animations and left—straight—right shoot gestures 075 activate attacking animations, illustrated in FIG. 22(*c*). The illustrative embodiment is understood to be non-limiting. In alternate embodiments the avatar can be one of a soldier, robot, monster or any other avatar, and alternate game embodiments include archery, shooting, or other action game.

It is to be understood that many additional games may be derived from the touch and gesture control method illustrated in FIGS. 7, 9 and 13 to 20. Specifically, badminton, squash, and handball are derivatives of the illustrative example for tennis (FIG. 15), and rounders and cricket are derivatives of the baseball illustration (FIG. 16). Furthermore, various other throwing games maybe derived, for example, beanbag toss and dart games are straight forward to derive, with touch gestures to aim and throw an object (beanbag, horseshoe, dart etc.) via the gesture illustrated in FIG. 4(*b*), for example.

Virtual Reality Game Control

The methods and systems of the disclosed invention are also applicable to virtual reality (VR) game applications. A representative VR headset is the Samsung Gear VR, which is a headset comprising mechanical lenses, a track pad, and two proprietary buttons (collectively sensors 100). An Android mobile phone 300 is clipped into the Gear VR headset, and provides the display 308 and processor 303, illustrated in FIG. 1. Another example of a VR viewing device, designed solely for the function of viewing content, is the Google Cardboard. In this design a mobile phone 300, iPhone or Android, is held in a cardboard headset which has two lenses with a 45 mm focal distance from the display 306 of a control device 300.

The Oculus Rift (Oculus VR) is an illustrative VR system that is powered by an external personal computer (PC). The Oculus includes a headset with architecture similar to the control device 300 with a communication interface 301, OLED panel for each eye display 308, a RAM memory controller 305, and a power supply 307. The communication interface 301 controls various inputs including a headphone jack, an XBOX One controller, motion sensor 101 inputs, HDMI, USB 3.0 and USB 2.0, and 3D mapped space input via a "constellation" camera system. The OLED panel for each eye is an HD, or optional UHD, and uses a low persistence display technology rendering an image for 2 milliseconds of each frame. The RAM memory controller 305 renders 3D audio with input of 6DOF (3-axis rotational tracking+3-axis positional tracking) through USB-connected IR LED sensor, which tracks via the "constellation" method. The power supply 307 is enabled via a USB connection to the PC connected to the "constellation cameras". The PC required to operate the Oculus has the following minimum specifications: CPU equivalent to an Intel Core i5-4590, at least 8 GB or RAM, at least an AMD Radeon R9 290 or Nvidia GeForce GTX 970 graphics card, an HDMI 1.3 output, three USB 3.0 ports and one USB 2.0 port with Windows 8 or newer. The Oculus supports two additional external sensor devices 310 called Oculus Touch, one for each hand, and each with two buttons, a touch sensitive joystick and motion sensors. As illustrative prior art, shooting in an Oculus game is typically controlled by a button press on the external sensor device 310.

FIGS. 23(*a*)-(*b*) illustrate an exemplary embodiment of the invention for a VR tank game. FIG. 23(*a*) illustrates a user 015 and VR system 600, which can be any of the representative systems described herein, where the headset has a similar architecture to the control device 325 and may include an externally connected PC for processing. The system 600 includes at least one external control device 310 with touch 102 and motion 101 sensors 100, connected wirelessly or via a cable to the system 600. The external control device 310 can be a smart phone, a smart watch, an Oculus Touch, or any other external control device 310 that enables touch and motion input to the system 600 via sensors 100.

In the illustrative embodiment of FIG. 23(*b*), touch sensor 102 controls the motion of the tank 650 in a 3D virtual world and illustrated in FIG. 23(*c*), left—right gestures and the trigger gesture 075 input to motion sensors 101, control the rotation of the tank turret and the shooting of the gun. Hence, in the exemplary embodiment of the inventive method of FIG. 23, no buttons are required for control of the illustrative VR game.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention made without departing from the spirit and scope of the invention.

What is claimed is:

1. A cloud-based gaming system, comprising:
a plurality of control devices each having motion sensors and a touch screen;
a gaming server including a gaming rules engine; and
a plurality of display devices;
wherein the plurality of control devices and display devices are connected via a network to the gaming server;
wherein the gaming rules engine manages game play for a plurality of users for a plurality of games being concurrently played, each user using one of the control devices to control play in a respective game by holding the control device in one hand with the touch screen facing the user and using thumb motions upon the touch screen using the one hand holding the device to control the motions and animations of an avatar displayed on the touch screen or an external display device and to tilt the control device to generate tilt gestures;
wherein motion sensor data relating to the tilt gestures from each of the control devices are used to trigger events of the games being played;
wherein the motion sensor data from each of the control devices includes gravity sensor data, the gravity sensor data used to define the orientation of each of the control devices relative to the center of the earth, each of the tilt gestures for each of the respective control devices determined to have occurred when the control device is held with the screen facing the user and moved by thumb action into a sloping position at an angle relative to the defined orientation and a computed maximum angular velocity of the tilting exceeds a predetermined threshold; and
wherein the tilt gestures are gestures that trigger specific discrete game events that occur in succession to control the game play.

2. The system of claim 1, wherein the motion sensor data further includes data from a gyroscope and an accelerometer.

3. The system of claim 1, wherein control of the respective game includes animation of one of shooting a basketball, throwing an American football, and bowling a bowling ball.

4. The system of claim 1, wherein control of the respective game includes rendering a virtual object trajectory with initial velocity proportional to the maximum computed angular velocity.

5. The system of claim 1, wherein control of the respective game includes animation of one of hitting a tennis ball, pitching a baseball, hitting a baseball, hitting a hockey puck, kicking a soccer ball, casting a fishing rod, and a boxing punch.

6. The system of claim 1, wherein control of the respective game includes rendering a graphic providing visual feedback to the user regarding strength of a gesture.

7. The system of claim 6, wherein the rendered graphic is displayed on one of the control devices.

8. The system of claim 1, wherein the respective game is a virtual reality game.

9. The system of claim 1, wherein the plurality of control devices are in a stadium.

10. The system of claim 1, wherein at least one display device is a digital board in a stadium.

11. The system of claim 1, wherein the respective game is a virtual reality game.

* * * * *